(12) United States Patent
Viswambharan et al.

(10) Patent No.: US 11,582,183 B2
(45) Date of Patent: Feb. 14, 2023

(54) METHODS AND APPARATUS TO PERFORM NETWORK-BASED MONITORING OF MEDIA ACCESSES

(71) Applicant: The Nielsen Company (US), LLC, New York, NY (US)

(72) Inventors: Sanjeev Kumar Viswambharan, Frisco, TX (US); Achilleas Papakostas, Dallas, TX (US)

(73) Assignee: THE NIELSEN COMPANY (US), LLC, New York, NY (US)

(*) Notice: Subject to any disclaimer, the term of this patent is extended or adjusted under 35 U.S.C. 154(b) by 0 days.

(21) Appl. No.: 17/362,736

(22) Filed: Jun. 29, 2021

(65) Prior Publication Data

US 2021/0409367 A1 Dec. 30, 2021

Related U.S. Application Data

(60) Provisional application No. 63/046,312, filed on Jun. 30, 2020.

(51) Int. Cl.
| | |
|---|---|
| *H04L 61/45* | (2022.01) |
| *H04L 67/02* | (2022.01) |
| *H04L 61/256* | (2022.01) |
| *H04L 101/395* | (2022.01) |

(52) U.S. Cl.
CPC .......... *H04L 61/45* (2022.05); *H04L 61/2564* (2013.01); *H04L 67/02* (2013.01); *H04L 2101/395* (2022.05)

(58) Field of Classification Search
CPC ............... H04L 61/45; H04L 2101/395; H04L 61/2564; H04L 67/02

USPC ....................................................... 709/245
See application file for complete search history.

(56) References Cited

U.S. PATENT DOCUMENTS

| | | | |
|---|---|---|---|
| 6,108,637 A | 8/2000 | Blumenau | |
| 8,370,489 B2 | 2/2013 | Mazumdar et al. | |
| 8,874,652 B1* | 10/2014 | Pecjak | G06Q 30/0204 709/224 |
| 9,392,075 B1* | 7/2016 | Radovnikovic | H04L 63/16 |
| 10,091,312 B1* | 10/2018 | Khanwalkar | H04L 67/02 |
| 10,559,009 B1* | 2/2020 | Kingman, Jr. | G06Q 30/0277 |
| 11,157,954 B1* | 10/2021 | Belanger | G06Q 30/0201 |
| 11,321,321 B2* | 5/2022 | Bhattacharjee | G06F 16/2228 |
| 2010/0281364 A1* | 11/2010 | Sidman | G06Q 30/02 715/713 |
| 2012/0158954 A1* | 6/2012 | Heffernan | H04L 43/0876 709/224 |

(Continued)

*Primary Examiner* — Melvin H Pollack
(74) *Attorney, Agent, or Firm* — Hanley, Flight and Zimmerman, LLC

(57) ABSTRACT

An example apparatus includes: at least one memory; instructions in the apparatus; and processor circuitry to execute the instructions to: determine whether a census impression record corresponds to a panelist impression record by: comparing a first internet protocol (IP) address of the panelist impression record with a second IP address of the census impression record; and comparing a first timestamp of the panelist impression record with a second timestamp of the census impression record; and send a comparison result to a computer of an audience measurement entity, the comparison result indicative of a match confirming the census impression record corresponds to the panelist impression record of the audience measurement entity.

26 Claims, 11 Drawing Sheets

(56) References Cited

U.S. PATENT DOCUMENTS

| | | | | |
|---|---|---|---|---|
| 2012/0324101 A1* | 12/2012 | Pecjack | ................... | H04L 67/02 709/224 |
| 2013/0198125 A1* | 8/2013 | Oliver | ................ | G06Q 30/0246 706/46 |
| 2013/0198376 A1* | 8/2013 | Landa | .................... | G06Q 30/02 709/224 |
| 2013/0311478 A1* | 11/2013 | Frett | ....................... | H04H 60/64 707/E17.014 |
| 2014/0046777 A1* | 2/2014 | Markey | ............. | G06Q 30/0275 705/14.66 |
| 2014/0156761 A1* | 6/2014 | Heffernan | ............... | H04L 67/02 709/206 |
| 2014/0214978 A1* | 7/2014 | Splaine | .................. | H04L 51/32 709/206 |
| 2014/0244345 A1* | 8/2014 | Sollis | ..................... | G06Q 30/02 705/14.42 |
| 2014/0278934 A1* | 9/2014 | Gutierrez | ........... | G06Q 30/0246 705/14.45 |
| 2014/0324544 A1* | 10/2014 | Donato | ............. | G06Q 30/0204 705/7.33 |
| 2014/0324545 A1* | 10/2014 | Splaine | .............. | G06Q 30/0277 705/7.33 |
| 2014/0325551 A1* | 10/2014 | McMillan | ........ | H04N 21/25841 725/20 |
| 2014/0337104 A1* | 11/2014 | Splaine | .............. | G06Q 30/0204 705/7.33 |
| 2015/0106505 A1* | 4/2015 | Ramaswamy | ... | H04N 21/25883 709/224 |
| 2015/0332291 A1* | 11/2015 | Gillooly | ............... | G06Q 20/202 705/7.29 |
| 2016/0007083 A1* | 1/2016 | Gurha | .............. | H04N 21/42221 725/13 |
| 2016/0156588 A1* | 6/2016 | Prince | ................. | H04L 61/2007 709/245 |
| 2017/0126534 A1* | 5/2017 | Cimino | ............... | H04L 63/1425 |
| 2017/0236150 A1* | 8/2017 | Fiderer | ................... | H04L 67/22 705/14.49 |
| 2019/0279233 A1* | 9/2019 | Friedl | ................ | G06Q 30/0269 |
| 2019/0378162 A1* | 12/2019 | Goldberg | ........... | G06Q 30/0242 |
| 2020/0236427 A1* | 7/2020 | Nagar | ............ | H04N 21/44218 |
| 2020/0364755 A1* | 11/2020 | Ferris | ................ | G06Q 30/0276 |

\* cited by examiner

METHODS AND APPARATUS TO PERFORM NETWORK-BASED MONITORING OF MEDIA ACCESSES

RELATED APPLICATION

This patent arises from an application claiming priority to U.S. Patent Application No. 63/046,312, which was filed on Jun. 30, 2020, and entitled "Methods and Apparatus to Perform Network-Based Monitoring of Media Accesses." U.S. Patent Application No. 63/046,312 is hereby incorporated herein by reference in its entirety.

FIELD OF THE DISCLOSURE

This disclosure relates generally to computers that monitor media-access activities and, more particularly, to methods and apparatus to perform network-based monitoring of media access activities

BACKGROUND

Determining a size and demographics of an audience of a media presentation helps media providers and distributors schedule programming and determine a price for advertising presented during the programming. In addition, accurate estimates of audience demographics enable advertisers to target advertisements to certain types and sizes of audiences. To collect these demographics, an audience measurement entity enlists a group of media consumers (often called panelists) to cooperate in an audience measurement study (often called a panel) for a predefined length of time.

Figure 1A:
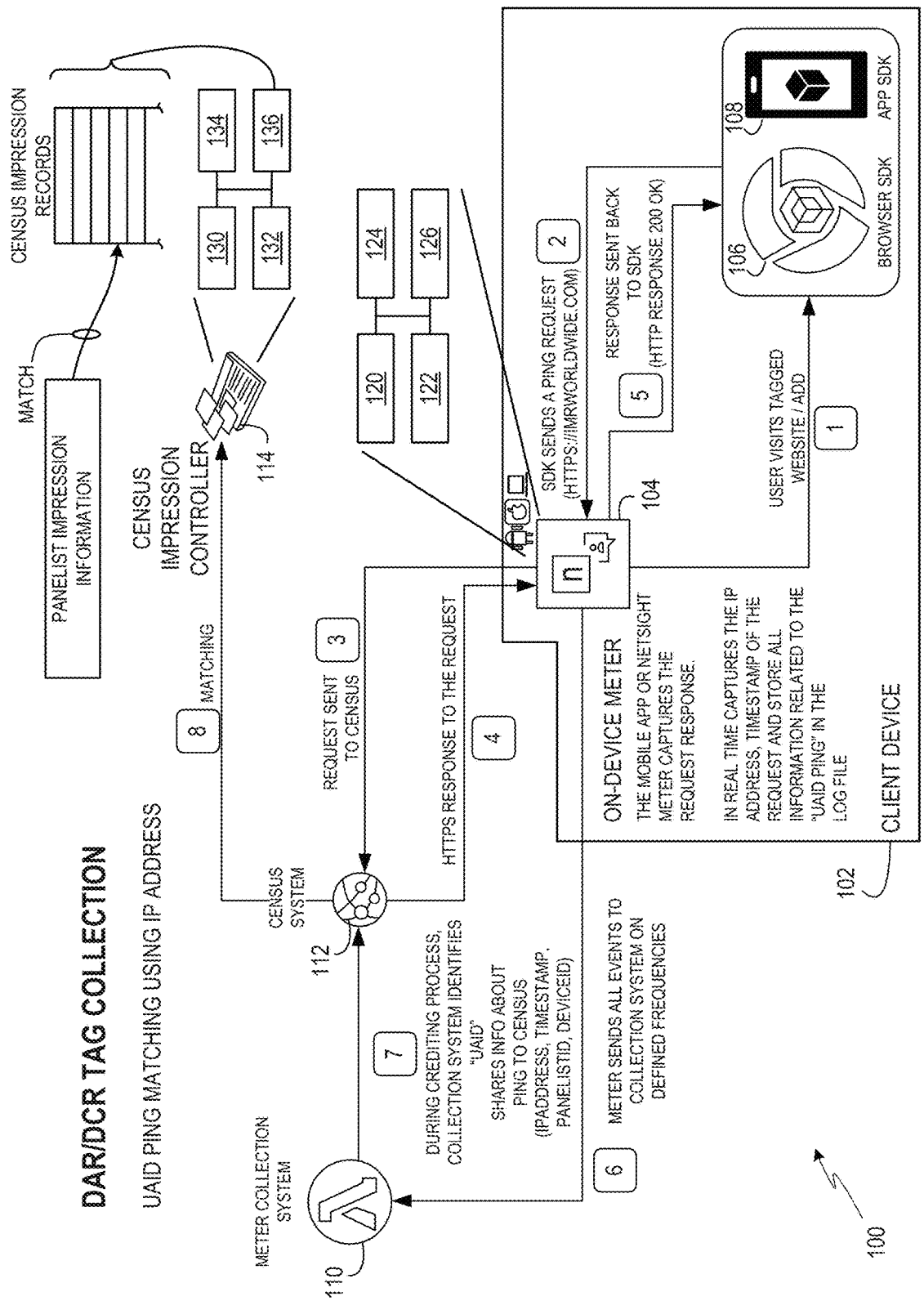
FIG. 1A is an example system to collect impression records of accesses to media and perform network-based monitoring of such accesses to the media.

The figures are not to scale. In general, the same reference numbers will be used throughout the drawing(s) and accompanying written description to refer to the same or like parts. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein "substantially real time" refers to occurrence in a near instantaneous manner recognizing there may be real world delays for computing time, transmission, etc. Thus, unless otherwise specified, "substantially real time" refers to real time+/−1 second. As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

Techniques for monitoring user access to an Internet-accessible media, such as digital television (DTV) media and digital content ratings (DCR) media, have evolved significantly over the years. Internet-accessible media is also known as digital media. In the past, such monitoring was done primarily through server logs. In particular, entities serving media on the Internet would log the number of requests received for their media at their servers. Basing Internet usage research on server logs is problematic for several reasons. For example, server logs can be tampered with either directly or via zombie programs, which repeatedly request media from the server to increase the server log counts. Also, media is sometimes retrieved once, cached locally and then repeatedly accessed from the local cache without involving the server. Server logs cannot track such repeat views of cached media. Thus, server logs are susceptible to both over-counting and under-counting errors.

The inventions disclosed in Blumenau, U.S. Pat. No. 6,108,637, which is hereby incorporated herein by reference in its entirety, fundamentally changed the way Internet monitoring is performed and overcame the limitations of the server-side log monitoring techniques described above. For example, Blumenau disclosed a technique wherein Internet media to be tracked is tagged with monitoring instructions. In particular, monitoring instructions are associated with the hypertext markup language (HTML) of the media to be tracked. When a client requests the media, both the media and the monitoring instructions are downloaded to the client. The monitoring instructions are, thus, executed whenever the media is accessed, be it from a server or from a cache. Upon execution, the monitoring instructions cause the client to send or transmit monitoring information from a content display site to a content provider site. The monitoring information is indicative of the manner in which content was displayed.

In some implementations, an impression request, also referred to herein as a ping request, can be used to send or transmit monitoring information by a client device using a network communication in the form of a hypertext transfer protocol (HTTP) request (or hypertext transfer protocol secure (HTTPS) request). In this manner, the impression request or ping request reports the occurrence of a media impression at the client device. For example, the impression request or ping request includes information to report access to a particular item of media (e.g., an advertisement, a webpage, an image, video, audio, etc.). In some examples, the impression request or ping request can also include a cookie previously set in the browser of the client device that may be used to identify a user that accessed the media. That is, impression requests or ping requests cause monitoring data reflecting information about an access to the media to be sent from the client device that downloaded the media to a monitoring entity and can provide a cookie to identify the client device and/or a user of the client device. In some examples, the monitoring entity is an audience measurement entity (AME) that did not provide the media to the client and who is a trusted (e.g., neutral) third party for providing accurate usage statistics (e.g., The Nielsen Company, LLC).

There are many database proprietors operating on the Internet. These database proprietors provide services to large numbers of subscribers. In exchange for the provision of services, the subscribers register with the database proprietors. Examples of such database proprietors include social network sites (e.g., Facebook, Twitter, MySpace, etc.), multi-service sites (e.g., Yahoo!, Google, Axiom, Catalina, etc.), online retailer sites (e.g., Amazon.com, Buy.com, etc.), credit reporting sites (e.g., Experian), streaming media sites (e.g., YouTube, Hulu, etc.), etc. These database proprietors set cookies and/or other device/user identifiers on the client devices of their subscribers to enable the database proprietor to recognize their subscribers when they visit their web site.

The protocols of the Internet make cookies inaccessible outside of the domain (e.g., Internet domain, domain name, etc.) on which they were set. Thus, a cookie set in, for example, the facebook.com domain is accessible to servers in the facebook.com domain, but not to servers outside that domain. Therefore, although an AME might find it advantageous to access the cookies set by the database proprietors, they are unable to do so.

The inventions disclosed in Mainak et al., U.S. Pat. No. 8,370,489, which is incorporated by reference herein in its entirety, enable an AME to leverage the existing databases of database proprietors to collect more extensive Internet usage by extending the impression request process to encompass partnered database proprietors and by using such partners as interim data collectors. The inventions disclosed in Mainak et al. accomplish this task by structuring the AME to respond to impression requests from clients (who may not be a member of an audience member panel and, thus, may be unknown to the audience member entity) by redirecting the clients from the AME to a database proprietor, such as a social network site partnered with the audience member entity, using an impression response. Such a redirection initiates a communication session between the client accessing the tagged media and the database proprietor. For example, the impression response received from the AME may cause the client to send a second impression request to the database proprietor. In response to receiving this impression request, the database proprietor (e.g., Facebook) can access any cookie it has set on the client to thereby identify the client based on the private records of the database proprietor. In the event the client corresponds to a subscriber of the database proprietor, the database proprietor logs/records a database proprietor demographic impression in association with the client/user.

As used herein, an impression (e.g., a media impression) is defined to be an event in which a home or individual accesses and/or is exposed to media (e.g., an advertisement, content, a group of advertisements and/or a collection of content). In Internet media delivery, a quantity of impressions or impression count is the total number of times media (e.g., content, an advertisement, or advertisement campaign) has been accessed by a web population (e.g., the number of times the media is accessed). In some examples, an impression or media impression is logged by an impression collection entity (e.g., an AME or a database proprietor) in response to an impression request from a user/client device that requested the media. In some examples, a media impression is not logged in association with demographics of an audience member that accessed the media. Such a media impression is referred to herein as a census impression. In other examples, a media impression is logged in association with demographics of the audience member. Such a media impression is referred to herein as a demographic impression. Census impressions typically result from instances in which the impression request does not include user/device-identifying information (e.g., a cookie or other identifier)

that can be used to identify the client device and/or user of the client device. Demographic impressions typically result from instances in which the impression request does include user/device-identifying information (e.g., a cookie or other identifier) that can be used to identify the client device and/or user of the client device. In such examples, the user/device-identifying information can be used to retrieve personally identifiable information (PII) from a database of the impression collection entity to associate with the logged demographic impression. In this manner, large volumes of logged demographic impressions can be used to generate audience metrics representative of demographic distributions for audiences that accessed different media items.

In some implementations, to collect impression data, an on-device meter provided by an AME is installed on a panelist client device. The on-device meter can be a mobile meter or a PC (personal computer) meter. A panelist client device is owned and/or used by an audience member that has enrolled as a panel member of an audience panel created and maintained by the AME. As part of the panel enrollment process, the panel member provides demographic information (e.g., PII) to the AME which the AME stores in association with one or more user/device identifiers to log demographic impressions when the panel member accesses media via a client device that reports an impression request. The AME uses the audience panel and the collected panel demographic information for the purpose of monitoring media access activities and generating corresponding audience metrics indicative of media impression counts, media impression frequencies, unique audience sizes, media access habits of audiences, reach of media, etc. The installed on-device meter intercepts impression requests generated in the client device. For example, monitoring instructions can be executed by a web browser or an app that cause the client device to send impression requests based on accessed media. The monitoring instructions can be provided as a tag in media based on a software development kit (SDK) provided by the AME. Additionally or alternatively, the monitoring instructions can be provided in an app as a collector. In either case, a web browser or an app is responsive to the monitoring instructions by sending impression requests based on accessed media. On a panelist device, when the installed meter intercepts the impression requests, the on-device meter allows transmission of (e.g., sends, forwards, or does not prevent completion of transmission of) corresponding census impression requests to a census system and also logs panel impression data for sending to an AME meter collection system based on the intercepted impression requests. The census system receives census impression requests from panelist devices and other non-panelist devices (e.g., millions of other non-panelist devices). While the AME meter collection system can identify panelist devices, the census system receives the census impression requests as anonymous impression requests. The monitoring instructions executed by a web browser or an app cannot differentiate between panelist and non-panelist devices. This is a problem for prior audience metric techniques that use installed on-device meters because panel media impression records collected by an AME meter collection system cannot be matched or correlated with census impression records collected by a census system.

On-device meters for online media, such as Nielsen's digital meters (e.g., electronic mobile measurement (EMM) and Netsight PC meter), capture and measure web and app data across many client devices (e.g., Android and iOS Mobile devices). Web and/or app measurements can be based on the network traffic coming in and out the client device. For example, for Android-based devices (by choice due to virtual private network (VPN) performance impacts), web measurements are exclusively based on network traffic. But for iOS-based devices, both web and app measurements are based on network traffic.

There are millions of websites and apps across the world. A software development kit (SDK) (e.g., a Nielsen SDK) including monitoring instructions for monitoring media accesses can be included in apps and/or websites. As such, when a user visits SDK-instrumented websites or media from an SDK-instrumented app, monitoring instructions of the SDK cause a client device to send a ping request (e.g., an HTTPS request with a destination URL of https://<nuid>.nuid.imrworldwide.com) so that the on-device meter can capture the ping request that is sent by the browser/app. The ping request generated by the SDK monitoring instructions includes media identification information of the accessed media, a timestamp of when the media was accessed, a public IP address (e.g., external IP address) of the client device, etc.

Due to technology limitations, header information of a ping request is not accessible in the clear by an intercepting program when the ping request is implemented as an HTTPS request. As such, when a ping request is intercepted by an on-device meter, the on-device meter can only read the host/domain part of the HTTPS request (e.g., https://<hostname>/param?) without being able to access other details (e.g., media identification information, timestamp, public IP address, etc.). As such, in any HTTPS request, only the text until the first forward slash ('/') is available in the clear to the intercepting meter. In some examples, while on-device meters on mobile devices cannot access header information of an HTTPS-based ping request, on-device meters on some PCs may be configured to access that header information as a PC may not be subject to the same technology limitations of mobile devices. In any case, on-device meters that cannot access the header information in an HTTPS-based ping request are not able to obtain media identifying information to identify the media accessed by a client device.

In prior techniques, to overcome limitations of inaccessible header information, the SDK monitoring instructions for monitoring media add an 'id' as a prefix to the hostname information, hence making the URL dynamic (e.g., <nuid>.nuid.imrworldwide.com). However, this raises another challenge that domain name system (DNS) resolution takes longer, has to happen for every such request (as they all have different ids), and costs more money (as the SDK has to add the 'id' prefix for all client devices since it does not know which device belongs to a panelist and which does not). As such, this prior solution can be manageable for limited deployments but is not easily scalable across multiple countries, as making it global would incur millions of dollars just for DNS resolution.

Unlike prior techniques, examples disclosed herein provide solutions to identify media accessed on panelist devices based on intercepting copies of HTTPS-based census ping requests in a manner that is scalable, platform-independent, and significantly reduces costs associated with collecting impression data without having to create millions of dynamic domains. Examples disclosed herein provide a solution that can be similarly deployed and operated across different computing platforms (e.g., Android, iOS, PC, etc.), substantially reduces or eliminates any traces or patterns that could be discovered by other non-intended parties, and substantially reduces or eliminates security risks such as denial-of-service (DoS) attacks.

Examples disclosed herein can be implemented without relying on on-device meters (e.g., VPNs or proxies) to intercept the network communication traffic, and block ping requests from the SDK monitoring instructions. Examples disclosed herein can be used to detect the ping requests (e.g., census ping requests) from the SDK monitoring instructions in multiple platforms (e.g., Android, iOS, PC, etc.). In examples disclosed herein, for ping requests from the SDK monitoring instructions in panelist client devices, the on-device meters in those panelist client devices intercept copies of the ping requests and log the occurrences of the ping requests as panelist impression records (e.g., in databases and/or log files). However, the on-device meters do not impede the transmission of the ping requests to their intended destination. Although the on-device meters cannot access header information in an intercepted ping request, the on-device meters access a panelist ID (PanelistID), a client device ID (DeviceID, MobileID, etc.), a public internet protocol (IP) address, a timestamp, etc. from memory and/or other places in the panelist client devices in real time and log this information as panelist impression information in panelist impression records (e.g., in databases or log files). The on-device meters allow transmission of (e.g., send, forward, or do not interfere with sending of) the intercepted ping requests as census ping requests to a census system. In addition, the on-device meters send log files of the logged panelist impression records including panelist impression information to an AME meter collection system. In examples disclosed herein, for each census ping request sent to the census system there is a corresponding panelist impression request logged in a panelist impression record by an on-device meter of a panelist client device. As such, since the generation and transmission of the SDK-originated ping request and the logging of the SDK-originating ping request in a panelist impression record by the on-device meter occur substantially simultaneously, or concurrently, in substantially real time with a very small time difference, the probability of a public IP address changing between when the SDK-originating ping request was generated and the time the on-device meter collected and logged the panelist impression record is negligible.

A census system that receives the census ping requests can perform unique audience ID (UAID) ping matching as a comparative analyses based on public IP addresses and timestamps to identify census ping requests logged by the census system matching logged panelist impression records from panelist client devices collected by the AME meter collection system. In examples disclosed herein, the public IP address in a ping request is the public IP address associated with the client device that sent the ping request, and the timestamp is indicative of the time and/or date when corresponding media was accessed. In this manner, panelist impressions logged by the AME meter collection system can be associated with media-identifying information (e.g., media identifiers) logged in impression records of the census system. That is, even though an on-device meter cannot access media-identifying information in an HTTPS-based census ping request sent by a browser or app based on an SDK monitoring instructions, the AME meter collection system can use the public IP address and timestamp information collected by the on-device meter to request that the census system provide such media-identifying information from census impression records having matching public IP addresses and timestamps. In this manner, the AME meter collection system can generate demographic impressions for corresponding media based on usage of panelist client devices by its panel members. Examples disclosed herein substantially reduce or eliminate security risks associated with unintended parties understanding traffic patterns and eventually identifying panelists of the AME. That is, using examples disclosed herein, unintended parties cannot analyze and understand the differences in traffic patterns between panelist client devices and non-panelist client devices (e.g., for every SDK-originated ping request (a census impression request to https://imrworldwide.com) there is a matching logged panelist impression request from the on-device meter).

For example, techniques disclosed herein intercept census ping requests while substantially reducing or eliminating the likelihood that unintended parties can detect traffic corresponding to such intercepted traffic. Since on-device meters are installed on client devices corresponding to panelists of an AME, an on-device meter intercepting a census ping request in a client device means the client device is a panelist client device corresponding to an AME panelist. In such examples, when a monitoring instruction causes a web browser or an app to send a census ping request, an on-device meter intercepts the traffic and generates panelist impression information for sending to an AME server of an AME meter collection system. However, examples disclosed herein may be implemented to process the intercepted traffic in a way that an AME server of an AME meter collection system does not return an error response (e.g., an HTTP 404 response) for each intercepted census ping request. That is, instead of the on-device meter forwarding individual intercepted census ping requests (and associated panelist information) to an AME server, which would result in error responses (e.g., HTTP 404 responses) from the AME server, the on-device meter generates a local log (e.g., a log file) of panelist impression information, and forwards the log to the AME server. This substantially reduces or eliminates the likelihood that unintended parties can identify a panelist by analyzing patterns of forwarded census ping requests followed by returned error responses (e.g., HTTP 404 responses). For example, an internet service provider can be prevented from seeing that a certain home receives HTTP 404 responses when sending census ping requests and use this information to identify a panelist.

In examples disclosed herein, example panelist identifiers (e.g., Panelist IDs) and/or client device identifiers (e.g., Device IDs) may include hardware identifiers (e.g., an international mobile equipment identity (IMEI), a mobile equipment identifier (MEID), a media access control (MAC) address, etc.), an app store identifier (e.g., a Google Android ID, an Apple ID, an Amazon ID, etc.), an open source unique device identifier (OpenUDID), an open device identification number (ODIN), a login identifier (e.g., a username), an email address, user agent data (e.g., application type, operating system, software vendor, software revision, etc.), third-party service identifiers (e.g., advertising service identifiers, device usage analytics service identifiers, demographics collection service identifiers), cookies etc. In some examples, example panelist identifiers (e.g., Panelist IDs) and/or client device identifiers (e.g., Device IDs) may additionally or alternatively include AME-server-generated unique IDs generated by a server (e.g., the AME server 105) to uniquely identify client devices such as the client device 102. In such examples, the AME-server-generated unique IDs may be generated as a binary value, alphanumeric characters, and/or any other type of value/text. In some examples, such AME-server-generated unique IDs may be generated using random or pseudorandom values. In some examples, the AME-server-generated unique IDs are generated for panelists when the panelists are enrolled into an AME panel by the AME.

Figure 1B:
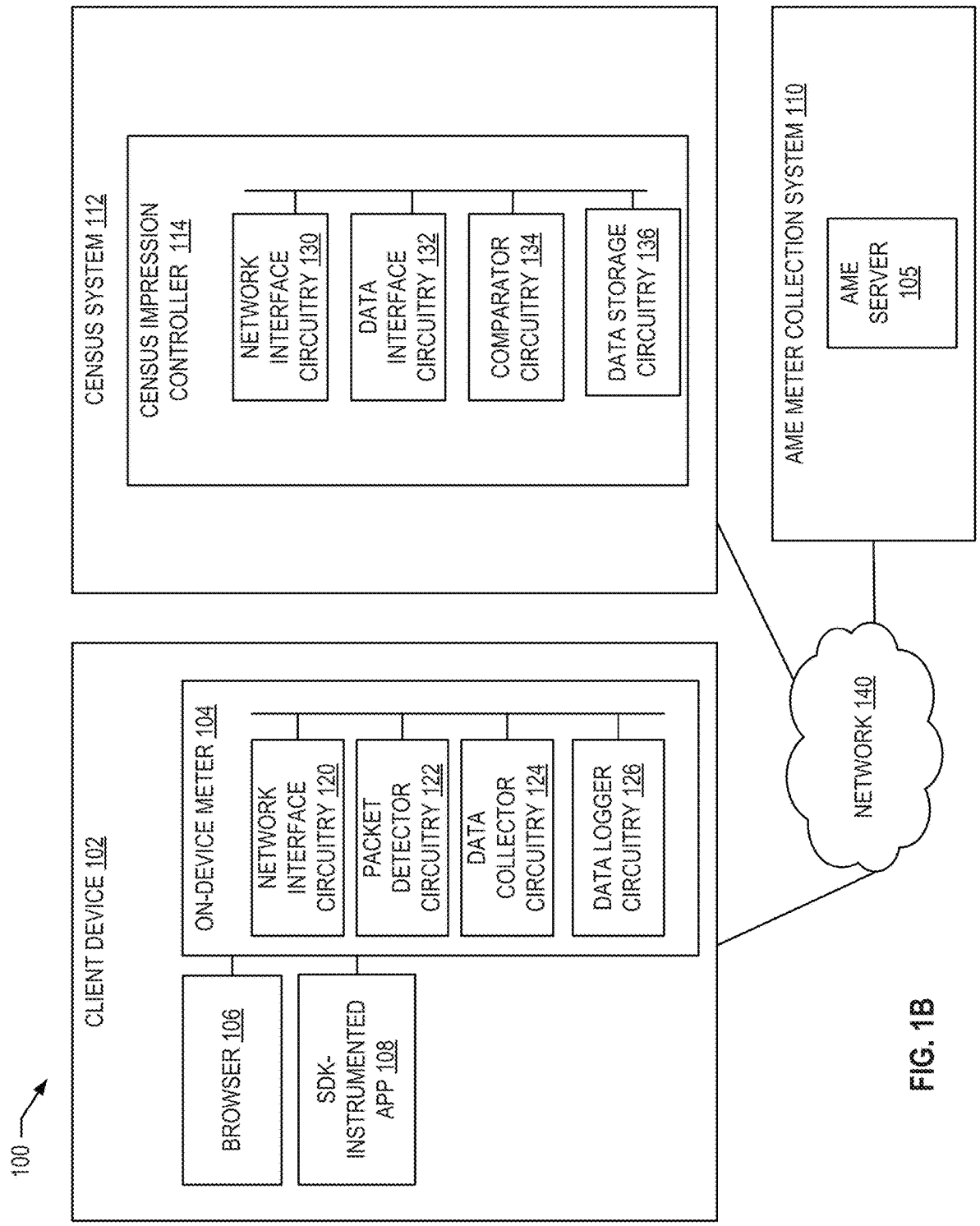
FIG. 1B is a block diagram of the example system of FIG. 1A.

FIG. 1A is an example system 100 to collect impression records representative of network-based accesses to media and perform network-based monitoring of such accesses to the media based on UAID ping matching. FIG. 1B is a block diagram of the example system 100 of FIG. 1A. The example system 100 of FIGS. 1A and 1B includes an example client device 102, an example audience measurement entity (AME) meter collection system 110, and an example census system 112. As shown in FIG. 1B, the example client device 102, the example audience measurement entity (AME) meter collection system 110, and the example census system 112 are in communication via an example network 140 (e.g., the Internet). The example client device 102 includes an example on-device meter 104, an example browser 106, and an example SDK-instrumented app 108. The example on-device meter 104 includes an example network interface circuitry 120, an example packet detector circuitry 122, an example data collector circuitry 124, and an example data logger circuitry 126. The example AME meter collection system 110 includes an example AME server 105. The example census system 112 includes an example census impression controller 114. The example census impression controller 114 includes an example network interface circuitry 130, an example data interface circuitry 132, an example comparator circuitry 134, and an example data storage circuitry 136.

The example client device 102 is a panelist client device because it includes the on-device meter 104 which is used to identify an AME panelist corresponding to the client device 102. Other client devices that do not belong to panelists are referred to herein as non-panelist client devices and do not include the on-device meter 104 but do include the browser 106 and the SDK-instrumented app 108 to access media, including tagged media. In this example, both the browser 106 and the SDK-instrumented app 108 are capable of sending media impression requests (e.g., census ping requests) to the census system 112. However, the SDK-instrumented app 108 and the browser 106 do not rely on each other, and the system 100 could operate with only one of the SDK-instrumented app 108 or the browser 106 present on the client device 102.

The example browser 106 may be any mobile or PC browser and executes SDK monitoring instructions in tagged media accessed by the client device 102. For example, the SDK monitoring instructions may be embedded in the tagged media as JavaScript instructions and/or any other type of suitable instructions. The example browser 106 may access, stream, or download the tagged media from a third-party server, for example, and execute the SDK monitoring instructions (e.g., JavaScript code) which cause the browser 106 to send a census ping request to the census system 112. In some examples, the third-party server embeds the SDK monitoring instructions in the media. The SDK-instrumented app 108 includes SDK monitoring instructions that cause the client device to retrieve information about tagged media accessed via the SDK-instrumented app 108 and send a census ping request to the census system 112.

The SDK monitoring instructions may be provided by an AME to media providers/publishers for use in embedding them into media and/or apps. The tagged media may also include media-identifying information (e.g., media identifiers, ad campaign identifiers, etc.) that is accessible by the browser 106 and/or the SDK-instrumented app 108 for placement into census ping requests so that the census impression controller 114 can identify accessed media using the media-identifying information. This type of media-identifying information may be referred to as metadata. In some examples, metadata may include information related to the type of media viewed, the duration of media viewing, the number of times a panelist interacts with the media, etc. In some examples in which the census ping requests are implemented using HTTPS requests, the media-identifying information is encrypted in a URL parameter of a census ping request such that the on-device meter 104 cannot obtain the media-identifying information from the intercepted census ping request. As such, the on-device meter 104 cannot send the media-identifying information in the panelist impression records to the AME server 105. However, the census impression controller 114 can decode the media-identifying information and log the media-identifying information in census impression records. Example matching techniques disclosed herein to find matches between panelist impression records sent from panelist client devices to the AME server 105 and census impression records logged by the census impression controller 114 allows the AME meter collection system 110 to obtain the media-identifying information from the census system 112 to determine media accessed by panelists monitored by the AME server 105.

The example on-device meter 104 may intercept census ping requests from the browser 106 and/or the SDK-instrumented app 108. To allow the example on-device meter 104 to communicate with the AME server 105, the on-device meter 104 includes the network interface circuitry 120. The example network interface circuitry 120 connects the on-device meter 104 to the network 140. In some examples, the network 140 may be the Internet. The example network interface circuitry 120 may be used to establish a virtual private network (VPN) interface or a proxy interface configured to intercept network communications (e.g., data packets) generated and/or sent by processes in the client device 102. The example network interface circuitry 120 may be implemented using a physical device (e.g., a network interface card (NIC), part of a system on a chip, etc.). In some examples, the network interface circuitry 120 may be implemented using software and/or may be virtualized. The example network interface circuitry 120 may also enable physical transmission of data packets containing media impression information (via wired or wireless connections) to the AME server 105. The example network interface circuitry 120 works in tandem with the packet detector circuitry 122 to send and receive these data packets.

The example packet detector circuitry 122 is configured to detect network packets intercepted by the network interface circuitry 120 that include one or more characteristics of interest. For example, if the browser 106 and/or the SDK-instrumented app 108 specifies a domain of the census system 112 (e.g., https://imrworldwide.com) in a uniform resource locator (URL) of a census ping request, the packet detector circuitry 122 can identify network packets having that domain in the URL and can ignore network packets without that domain. The example packet detector circuitry 122 may also prepare packets for transmission by the network interface circuitry 120. Additionally, the example packet detector circuitry 122 may identify streams of incoming data as packets containing a response from the AME server 105. The identification may be based on information in the body of a HTTP response, for example.

The example data collector circuitry 124 collects media impression data and information about the client device 102. As mentioned above, this information may be related to the accessing of tagged media. Information recorded could include what media was accessed for the media impression, how long the media was accessed, how the media was interacted with, how many times the media was viewed, etc. In addition to this media impression data and any associated metadata, the example data collector circuitry 124 also collects information for identification of the device itself. This may include a public IP address (e.g., an external IP address), a private IP address (e.g., an internal IP address), a timestamp associated with a media access, and/or any other identifying data for submission to the example AME meter collection system 110. The example on-device meter 104 does not have direct access to the public IP address corresponding to the client device 102. To obtain a public IP address, the example data collector circuitry 124 may interact with the network interface circuitry 120 to send a request to an outside server to obtain this information. However, as this may be a costly operation and may generate network traffic patterns observable by third parties to identify panelist devices, the example on-device meter 104 may perform this operation at periodic or aperiodic intervals (e.g., once every 5 minutes, once every 10 minutes, at different durations, etc.), rather than each time there is a new media impression request. As the public IP address of the example client device 102 is unlikely to change within a short interval, the system 100 can still perform matching with a high level of accuracy based the public IP address. Additionally, this interval may be adjusted based upon an expected level of media exposure or a previous rate of change of the pubic IP address associated with the client device 102. In some examples, private IP addresses may additionally be used to achieve a more accurate match to a corresponding client device 102. For example, a household or business may be assigned a single public IP address to an Internet gateway router that serves multiple client devices in the household or business based on private IP addresses assigned by the gateway router to those multiple client devices. As such, while a public IP address may be used to narrow an impression match down to a household or business, a private IP address can additionally be used to identify a particular client device in that household or business. To employ a private IP address, the browser 106 and/or the SDK-instrumented app 108 obtain and locate the private IP address in the census ping request sent to the census system 112, and the on-device meter 104 obtains and logs the private IP address in panel impression records sent to the AME meter collection system 110.

The example data logger circuitry 126 logs occurrences of intercepted census ping requests as panelist impression records in log files. Additionally or alternatively, the example data logger circuitry 126 can store the panelist impression records in a database of the client device 102. When it is time to send logs to the example AME meter collection system 110 (e.g., at periodic or aperiodic intervals of every hour, every two hours, every 24 hours, changing durations, etc.), the example data logger circuitry 126 collects new log entries from a log file in local memory of the client device 102 that have been created since the last transfer to the AME meter collection system 110, and sends the log file to the AME meter collection system 110. In some examples, a log file can be created at a time of transferring new log entries to the AME meter collection system 110 by retrieving log entries from a local database of the client device 102 and writing the log entries to the log file. The example network interface circuitry 120 forwards intercepted census ping requests to the census system 112. The example network interface circuitry 120 also sends log files of the logged panelist impression records and corresponding panelist impression information to the AME meter collection system 110. The example data logger circuitry 126 may also receive data from the data collector circuitry 124, the browser 106, the SDK-instrumented app 108, and/or the packet detector circuitry 122. The example data logger circuitry 126 may then package a panelist identifier, an IP address, a timestamp, metadata, and other data together as a panelist impression record. Each panelist impression record may then be placed in a log for transmission to the AME server 105. Subsequently, the example AME server 105 may send the panelist impression records to the example census impression controller 114 to request the census impression controller 114 to match census impression records to panelist impression records, thereby identifying media identified in the census impression records as accessed by panelists monitored by the AME server 105. As described above, the example data logger circuitry 126 can store a plurality of panelist impression records, therefore the on-device meter 104 does not have to send each panelist impression record to the meter collection system individually. Instead, the on-device meter 104 can send the data in larger batches and reduce communication overhead.

To match census impression records with panelist impression records, the census system 112 includes the census impression controller 114. The example census impression controller 114 is provided with the network interface circuitry 130 to receive census impression requests from the client device 102 and/or send responses to the client device 102. The example network interface circuitry 130 also receives match queries and panelist impression information from the AME meter collection system 110, and sends comparison analysis results to the AME meter collection system 110. The example network interface circuitry 130 may connect the census system 112 to the network 140. The example network interface circuitry 130 may be a physical device (e.g., a discrete network interface card, part of a system on a chip, etc.). In some examples, the network interface circuitry 130 may be implemented using software and/or may be virtualized.

The example census impression controller 114 is provided with the data interface circuitry 132 to log census impression records in a data store or memory based on census impression requests received from client devices. The example data interface circuitry 132 also accesses the census impression records in the data store or memory in response to process match queries from the AME meter collection system 110. The example comparator circuitry 134 performs comparison analyses between panelist impression information from the AME meter collection system 110 and logged census impression records to generate comparison analysis results. The comparison analysis results confirm matches between panelist impression records and census impression records. Such confirmed matches are indicative of census impression records corresponding to or attributable to AME panelists. In examples disclosed herein, the census impression controller 114 provides media-identifying information (e.g., a media identifier) in the comparison analysis results. When the AME meter collection system 110 receives the comparison analysis results from the network interface circuitry 130 of the census impression controller 114, the AME meter collection system 110 can use the media-identifying information in the comparison analysis results to identify media accessed by panelists monitored by the AME meter collection system 110.

The example census system 112 and the example AME meter collection system 110 may be implemented by computers and/or servers owned and/or operated by the AME. Alternatively, the example census system 112 may be owned and/or operated by an entity different from the AME. In some examples, the census system 112 and the AME meter collection system 110 may operate in the cloud on third-party servers, in the cloud as serverless functions, in a virtualized system, or any combination thereof.

Figure 2:
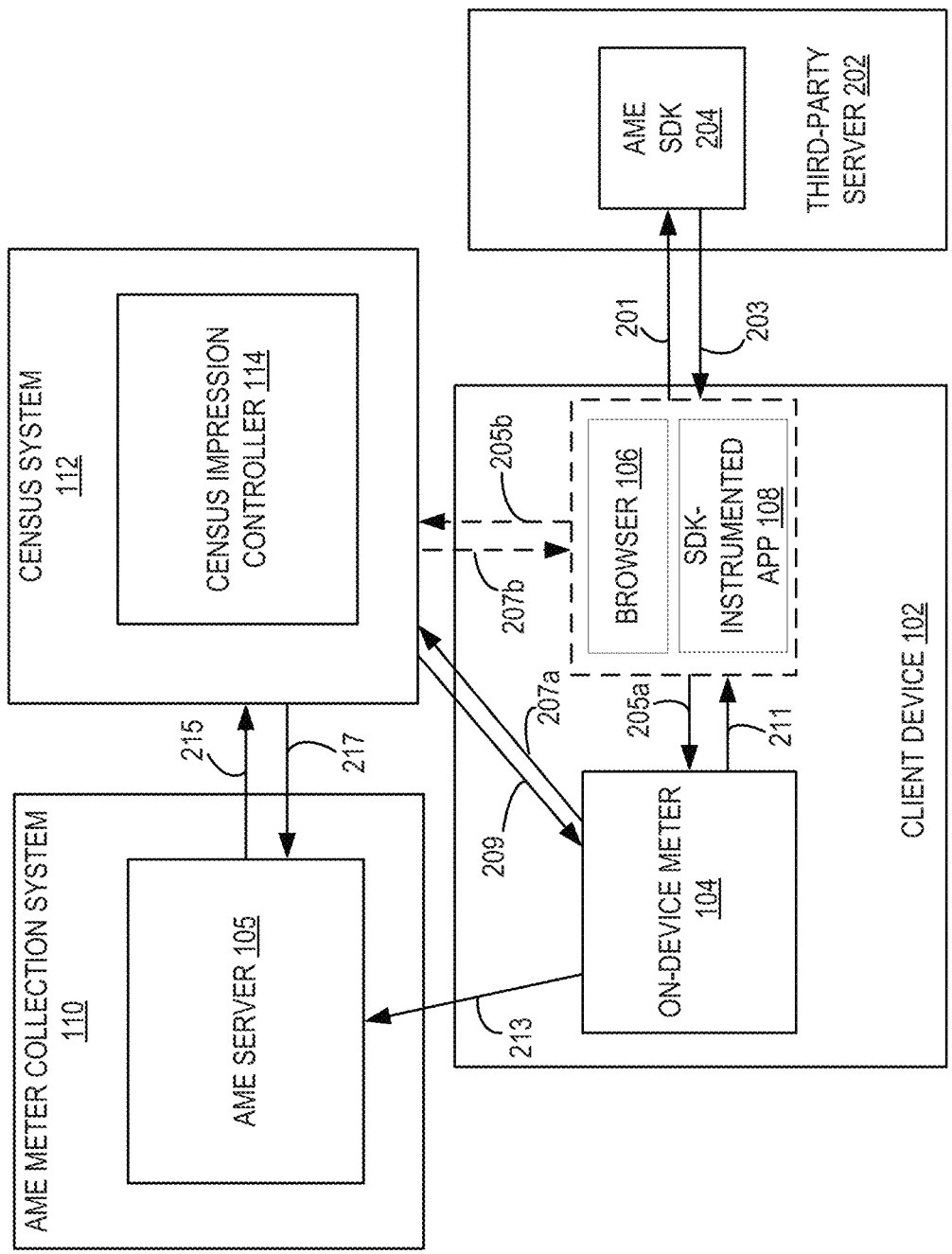
FIG. 2 is a diagram of the example system of FIGS. 1A and 1B in operation.

FIG. 2 illustrates certain elements of the example system 100 of FIGS. 1A and 1B in operation. Example arrows 201-217 are indicative of different phases of operation of the system of FIG. 2. In general, FIG. 2 shows how a media impression may be reported by the client device 102 via a ping request and how a match comparison result including media-identifying information may be provided by the census system 112. Additionally, FIG. 2 illustrates how a third-party server 202 that includes an AME SDK 204. The example AME SDK 204 includes software or instructions (e.g., SDK monitoring instructions) to be embedded in media served by the third-party server 202 to client devices and/or in apps installed in client devices. In some examples, the AME SDK 204 is placed on the third-party server 202 in agreement with the owner of the relevant assets (e.g., the owner of third-party server 202). The AME SDK 204 may be embedded within media and/or the SDK-instrumented app 108 to facilitate measurement of media activity by communicating media impression activity back to the audience measurement entity via census impression requests.

At arrow 201, the example browser 106 sends a request for media to the third-party server 202. At arrow 203, the example third-party server 202 serves the requested media to the browser 106 including embedded SDK monitoring instructions based on the example AME SDK 204. Additionally or alternatively, the SDK monitoring instructions from the example AME SDK 204 may be embedded in the SDK-instrumented app 108 provided by the third-party server 202 for installation on the client device 102. In any case, the browser 106 and/or the SDK-instrumented app 108 execute the SDK monitoring instructions and send census impression requests based on the SDK monitoring instructions. A census impression request may contain a payload of information including what media was viewed, how long the viewing occurred, and any metadata associated with the media.

In the next phase, at arrows 205-207, the example browser 106 and/or the example SDK-instrumented app 108 generates and sends a census ping request addressed to the census system 112 (e.g., https://imrworldwide.com), along with media identifying information in the header of the census ping request. However, at this point, the browser 106 and/or the SDK-instrumented app 108 do not know if the media was accessed by a panelist user or a non-panelist user. In examples in which a client device is a non-panelist device (e.g., the census ping request originated from a non-panelist device that does not include the on-device meter 104), the census ping request is sent by the non-panelist client device to the census system 112 without being intercepted by an on-device meter 104. A non-panelist request and response is shown by a dashed arrow 205b which represents a census impression request (e.g., based on an HTTPS request) from a non-panelist device and a dashed arrow 207b which represents an HTTPS response to the census impression request from the non-panelist device.

The SDK monitoring instructions from the example AME SDK 204 cause the browser 106 and/or the SDK-instrumented app 108 to provide in the census impression request a session ID, a public IP address associated with the client device 102, a timestamp corresponding to when the media was accessed, a media ID, etc. In some examples, the SDK monitoring instructions can also cause the browser 106 and/or the SDK-instrumented app 108 to provide a private IP address of the client device 102 in the census impression request. In examples disclosed herein, a session ID refers to a unique number that a web server assigns to a client device for the duration of that client device's visit to a website served by that web server. The session ID is stored by the web browser 108 or the SDK-instrumented app 108 that renders webpages of the visited website (e.g., as an identifier of 64 characters or any other suitable length). In examples disclosed herein, SDK monitoring instructions of the AME SDK 204 cause the browser 106 and/or the SDK-instrumented app 108 to obtain the session ID.

In the example of FIG. 2, the client device 102 is a panelist device because the client device 102 includes the on-device meter 104. Therefore, at arrow 205a, the census impression request is intercepted in substantially real time by the on-device meter 104. As noted above, the example on-device meter 104 can detect and read the domain part of the census ping request, but not the header since the census ping request is secure traffic (an HTTPS network communication). In response to intercepting the census ping request, the example on-device meter 104 records panelist impression information including the timestamp, the public IP address of the client device 102 on the network 140, and the panelist identifier (PanelistID) and/or device identifier (DeviceID, MobileID, etc.) corresponding to the user of the client device 102. For example, the on-device meter 104 may use a real-time clock of the panelist client device 102 to generate the timestamp, may query a network service of the panelist client device 102 and/or a separate server to access the public IP address, and may access the panelist identifier and/or device identifier from memory or a register of the panelist client device 102. In some examples, to obtain the public IP address, the on-device meter 104 executes a process on a repeating basis (e.g., every five minutes) that requests the public IP address from a network service of the panelist client device 102. Additionally or alternatively, the example on-device meter 104 may request the public IP address from the network service on an as-needed basis (e.g., on-demand) when the on-device meter 104 detects a census ping request from the browser 106 and/or the SDK-instrumented app 108. If the public IP address is requested from an off-device location (e.g., a website, a server, etc.), the on-device meter 104 may be configured to use a randomized list of beacons to connect to for obtaining the public IP address of the client device 102. In this manner, it is less likely to generate an observable pattern by the repeated network activity used to obtain the public IP address. In examples disclosed herein, the on-device meter 104 writes the ping request event as a web or app event (e.g., depending on the user agent) in a database and/or log file as a panelist impression record that includes the collected panelist impression information. In some examples, on-device meters installed on Android platforms write ping request events in databases and/or log files as web events only.

In turn, at arrow 207a, the example on-device meter 104 forwards the census ping request received from the browser 106 and/or the SDK-instrumented app 108 to the census system 112. In some examples, the on-device meter 104 does not control the forwarding or sending of the census ping request to the census system 112. Instead, the on-device meter 104 obtains a copy of the census ping request sent by the browser 106 and/or the SDK-instrumented app 108 by monitoring or sniffing network communications from the browser 106 and/or the SDK-instrumented app 108 and does not intervene in the communication flow of the census ping request from the browser 106 and/or the SDK-instrumented app 108 to the census system 112.

At arrow 209, the example on-device meter 104 receives an HTTPS response from the census system 112 in response to the census ping request. The HTTPS response need not provide any information but merely serves as an acknowledgement that the census system 112 received the census ping request. For example, the HTTPS response can be an HTTPS 200 OK success status response. At arrow 211, the on-device meter 104 forwards the HTTPS response to the browser 106 and/or the SDK-instrumented app 108. In other examples in which the on-device meter 104 does not intervene in the communication flow of the census ping request, the HTTPS response is received at the browser 106 and/or the SDK-instrumented app 108 without the on-device meter 104 as an intervening component.

At arrow 213, the on-device meter 104 sends a log file of one or more panelist impression records to the AME server 105 of the AME meter collection system 110. The sending of the log file may be done on a periodic or aperiodic basis. For example, the on-device meter 104 can send the log file to the AME meter collection system 110 every two hours or any other suitable frequency configured by the on-device meter 104 or set by the AME server 105.

The example AME meter collection system 110 scans panelist impression records in the log file during a crediting process (e.g., credit media with impressions) to recognize the web event records and/or app event records in the log file. The AME meter collection system 110 also parses the panelist impression information from the logged panelist impression records. At arrow 215, the example AME meter collection system 110 sends panelist impression information and match queries to the census system 112. The match queries are requests for the census impression controller 114 to compare the panelist impression information with logged census impression records collected by the census system 112 based on public IP addresses and timestamps.

The census impression controller 114 uses data in the received panelist impression records to identify census impressions logged by the census system 112 that corresponds to panelists of the AME. For example, the census impression controller 114 uses timestamps and public IP address in the panelist impression information from the AME meter collection system 110 to analyze and compare against timestamps and public IP addresses of census ping requests logged by the census system 112. In this manner, when a public IP address match is found between panelist impression information and a logged census impression that have substantially similar timestamps, the census impression controller 114 can determine that the matching logged census impression corresponds to a panelist impression record (e.g., the matching logged census impression is attributable to an AME panelist of the panelist impression information). In examples in which private IP addresses are also provided, the census impression controller 114 can also compare private IP addresses between panelist impression records and census impression records to identify particular client devices in a household or business that connect multiple client devices to the Internet via a gateway router. At arrow 217, the census impression controller 114 provides the AME meter collection system 110 comparison results in response to the match queries based on logged census impression records that correspond to AME panelist impression records. Example comparison results include media-identifying information (e.g., media IDs media accessed by client device) in association with the corresponding public IP addresses and timestamps. The example AME server 105 can use the media-identifying information to identify the media accessed by the client device 102 when the client device 102 sent the census ping request to the census system 112 and, thus, when the on-device meter 104 logged the panelist impression record. In this manner, matching AME panelist impression records to logged census impression records is useful for the AME server 105 to determine media accessed by panelists on panelist client devices. That is, because the on-device meter 104 cannot access payload contents of census impression requests sent using HTTPS requests, the on-device meter 104 cannot access a media ID in the census impression request. As such, although the on-device meter 104 can log that an access to media occurred on the panelist client device 102, the on-device meter 104 cannot identify what media was accessed. However, the census impression requests provide media IDs that are logged in census impression records by the census system 112. Matching panelist impression information to census impression records enables identifying media to which panelists were exposed. In addition, matching AME panelist impression records to logged census impression records is useful for an AME to generate demographic distributions of media accesses for subsets of census impressions. By understanding such demographic distributions for media, AME's can infer demographic distributions for the larger census audience reflected in the large quantities of anonymous census impressions logged by the census system 112 for the same media.

In some examples, the census impression controller 114 uses private IP address to increase the certainty of matches during the matching process. In such examples, the SDK monitoring instructions executed by the browser 106 and/or the SDK-instrumented app 108 of FIGS. 1A and 1B can provide a private IP address (e.g., an internal IP address) in census ping requests as part of the ping request payload. In addition, the on-device meter 104 can also include the private IP address in its logged panelist impression records. The private IP address can be used by the example census impression controller 114 to increase the certainty of matches. For example, matching of private IP addresses from a census ping request and a panelist impression record in addition to matching the public IP addresses provides further confirmation that the census ping request corresponds to the panelist impression record.

In some examples, such as when there is one family within a home, everybody may have the same public IP address. In such a scenario, if two people in the same household use the same app at substantially the same time, there may be a collision. Although the likelihood of such an event is relatively low, such an event can be avoided through use of a private IP address. As each device has a unique private IP address, the private IP address may be used to uniquely identify each person in the home, avoid collisions, and improve system accuracy.

While an example manner of implementing the on-device meter 104, the census impression controller 114, and the AME server 105 is illustrated in FIGS. 1A, 1B, and 2, one or more of the elements, processes, and/or devices illustrated in FIGS. 1A, 1B, and 2 may be combined, divided, rearranged, omitted, eliminated, and/or implemented in any other way. Further, the example network interface circuitry 120, the example packet detector circuitry 122, the example data collector circuitry 124, the example data logger circuitry 126, the example network interface circuitry 130, the example data interface circuitry 132, the example comparator circuitry 134 and/or, more generally, the example on-device meter 104 and/or the example census impression controller 114 and/or the example AME server 105 of FIGS. 1A, 1B, and 2 may be implemented by hardware, software, firmware, and/or any combination of hardware, software, and/or firmware. Thus, for example, any of the example network interface circuitry 120, the example packet detector circuitry 122, the example data collector circuitry 124, the example data logger circuitry 126, the example network interface circuitry 130, the example data interface circuitry 132, the example comparator circuitry 134, and/or, more generally, the example on-device meter 104 and/or the example census impression controller 114 and/or the example AME server 105, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). When reading any of the apparatus or system claims of this patent to cover a purely software and/or firmware implementation, at least one of the example the example network interface circuitry 120, the example packet detector circuitry 122, the example data collector circuitry 124, the example data logger circuitry 126, the example network interface circuitry 130, the example data interface circuitry 132, the example comparator circuitry 134 is/are hereby expressly defined to include a non-transitory computer readable storage device or storage disk such as a memory, a digital versatile disk (DVD), a compact disk (CD), a Blu-ray disk, etc., including the software and/or firmware. Further still, the example the on-device meter 104, the census impression controller 114, and the AME server 105 of FIGS. 1A, 1B, and 2 may include one or more elements, processes, and/or devices in addition to, or instead of, those illustrated in FIGS. 1A, 1B, and 2, and/or may include more than one of any or all of the illustrated elements, processes and devices.

Figure 3:
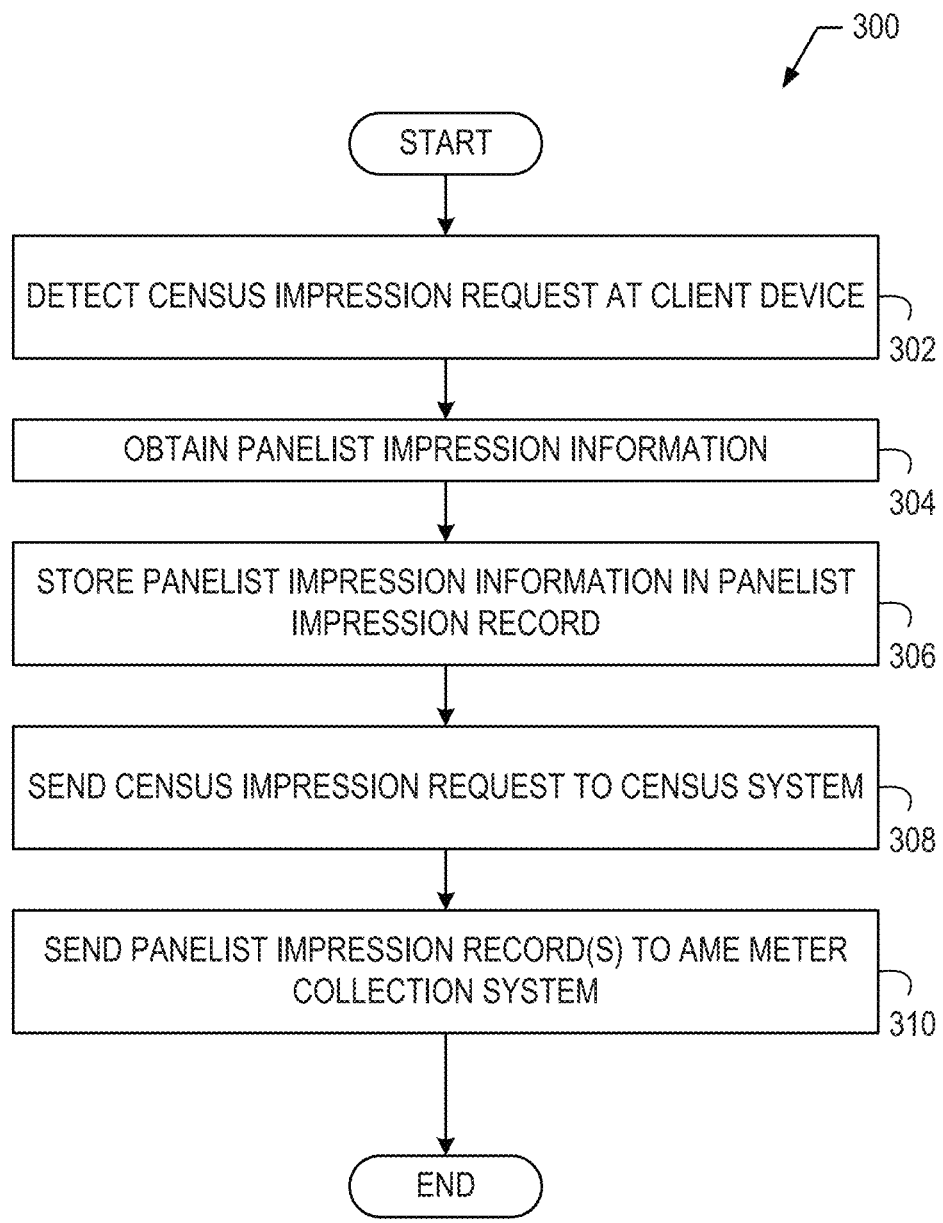
FIG. 3 is a flowchart representative of example computer-readable instructions that may be executed to implement the on-device meter of FIGS. 1A, 1B, and 2 to log media impressions on a client device and send logged impression data to an audience measurement entity (AME).
Figure 4:
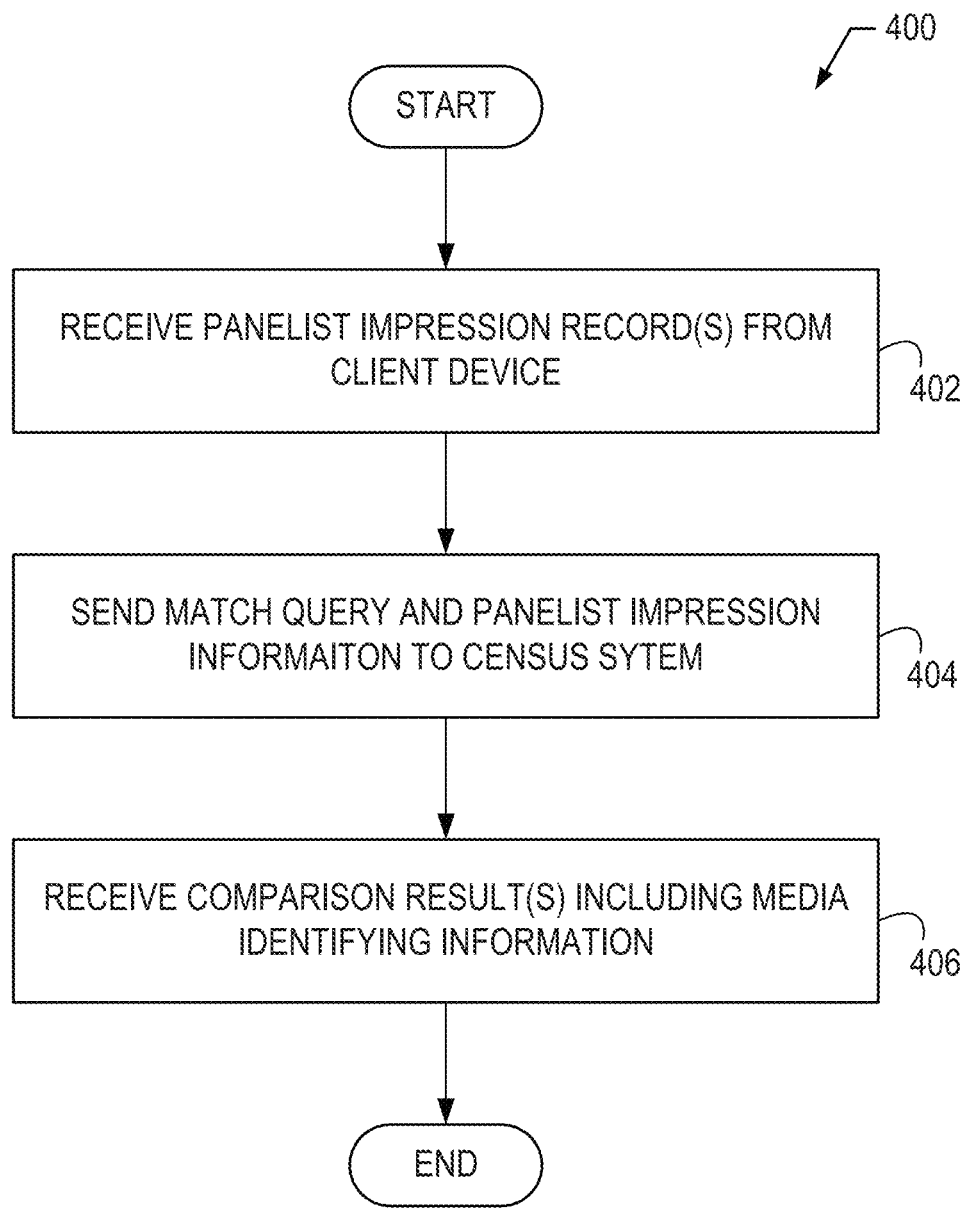
FIG. 4 is a flowchart representative of example computer-readable instructions that may be executed to implement the AME server of FIGS. 1A, 1B, and 2 to send match queries and receive comparison results from the census system.
Figure 5:
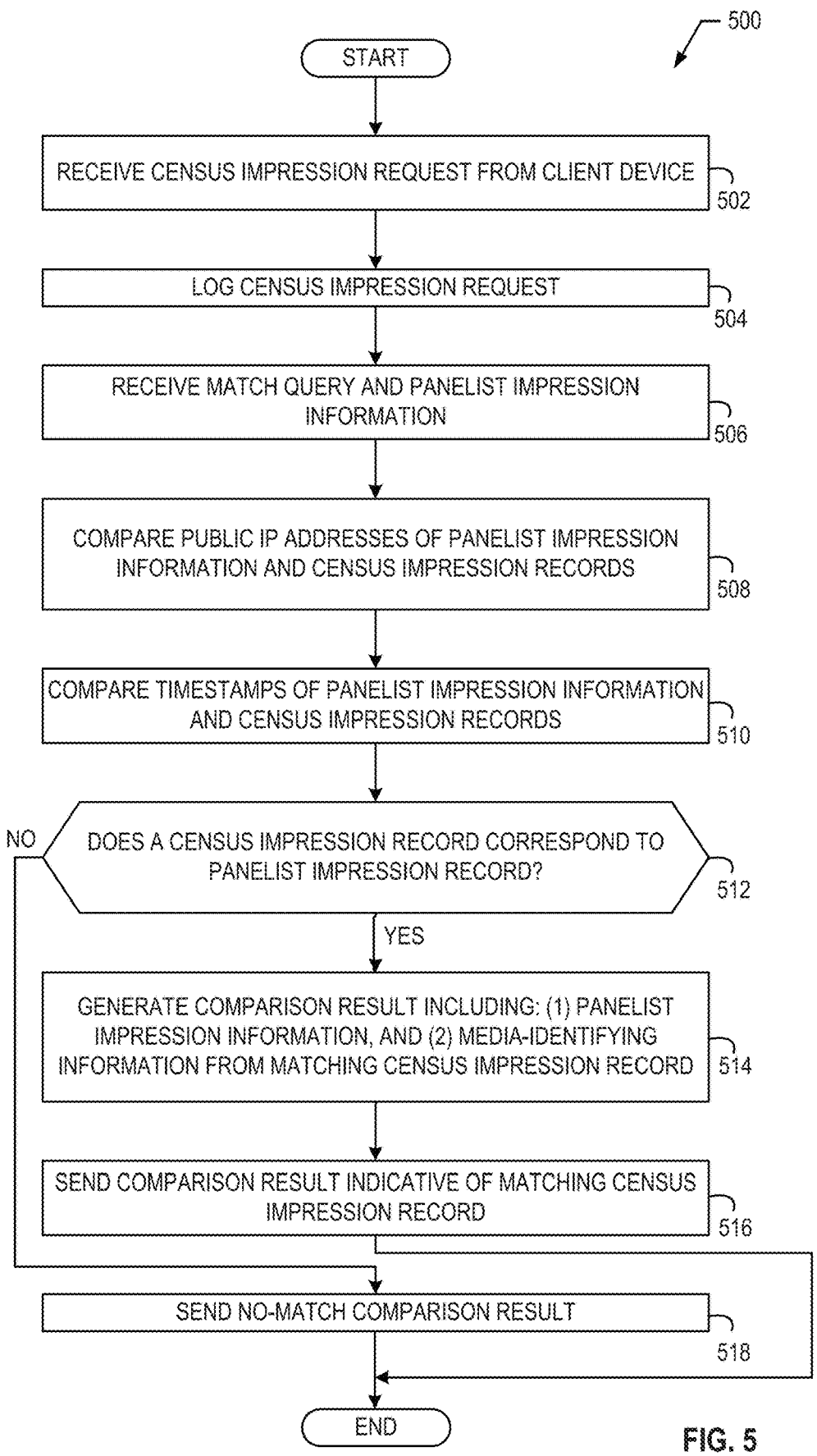
FIG. 5 is a flowchart representative of example computer-readable instructions that may be executed to implement the census impression controller of FIGS. 1A, 1B, and 2 to identify media accessed by panelists by confirming panelist impression records of the AME that correspond to census impression records that include media-identifying information for such media.

A flowchart representative of example hardware logic circuitry, machine readable instructions, hardware implemented state machines, and/or any combination thereof for implementing the example on-device meter 104 and/or the example census impression controller 114 and/or the example AME server 105 of FIGS. 1A, 1B, and 2 is shown in FIGS. 3, 4, and 5. The machine readable instructions may be one or more executable programs or portion(s) of an executable program for execution by processor circuitry, such as the processor circuitry 612, 712 shown in the example processor platform 600, 700 discussed below in connection with FIGS. 6 and 7 and/or the example processor circuitry discussed below in connection with FIGS. 6 and/or 7. The program may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although the example program is described with reference to the flowchart illustrated in FIGS. 3, 4, and 5, many other methods of implementing the example on-device meter 104 and/or the example census impression controller 114 and/or the example AME server 105 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 3-5 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

Turning in detail to the flowcharts, FIG. 3 is a flowchart representative of example machine readable instructions and/or example operations 300 that may be executed and/or instantiated by processor circuitry to implement the on-device meter 104 of FIGS. 1A, 1B, and 2 to log panelist media impressions and to send census ping requests indicative of census media impressions to the census system 112. The program of FIG. 3 begins at block 302 at which the example packet detector circuitry 122 (FIGS. 1A and 1B) detects a census impression request at the panelist client device 102 (FIGS. 1A and 1B). For example, the packet detector circuitry 122 may detect a domain name of the census system 112 in a (URL) of a network communication data packet intercepted by the network interface circuitry 120 (FIGS. 1A and 1B). In the illustrated example, the presence of the domain name of the census system 112 in the URL is indicative that the network communication is a census impression request destined for the census system 112. The example data collector circuitry 124 (FIGS. 1A and 1B) obtains panelist impression information from the panelist client device 102 (block 304). For example, the data collector circuitry 124 obtains a public IP address of the panelist client device 102, a timestamp of when the census impression request was received, and a panelist identifier (PanelistID) and/or device identifier (DeviceID, MobileID, etc.) corresponding to the user of the panelist client device 102. In some examples, the data collector circuitry 124 also obtains a private IP address of the client device 102.

The example data logger circuitry 126 (FIGS. 1A and 1B) stores the panelist impression information in a panelist impression record (block 306). For example, the data logger circuitry 126 stores the panelist impression information as a panelist impression record in a database or log file of the panelist client device 102 in association with a panelist identifier corresponding to a panelist audience member of an AME. The example network interface circuitry 120 sends the census impression request to the census system 112 (block 308). The example network interface circuitry 120 sends the panelist impression record (and any other collected panelist impression records) to the AME server 105 of the AME meter collection system 110 of the AME (block 310). For example, the network interface circuitry 120 can send the one or more panelist impression record(s) in a log file provided by the data logger circuitry 126. The example instructions of FIG. 3 end. However, execution of the instructions of FIG. 3 may be repeated any number of times to process more census impression requests detected by the packet detector circuitry 122.

FIG. 4 is a flowchart representative of example machine readable instructions and/or example operations 400 that may be executed and/or instantiated by processor circuitry to implement the AME server 105 (FIGS. 1A, 1B, and 2) to send match queries and receive comparison results from the census system 112 (FIGS. 1A, 1B, and 2). The program of FIG. 4 begins when the AME server 105 receives panelist impression record(s) from the on-device meter 104 of the client device 102 (block 402). As the AME server 105 does not receive media-identifying information from the on-device meter 104 for the panelist impression record(s), the AME server 105 queries the census system 112 to find matching census impression records for corresponding ones of the panelist impression records to identify media based on media-identifying information (e.g., media IDs) in matching ones of the census impression records. To accomplish this, the AME server 105 sends a match query and panelist impression information to the census system 112 (block 404). The AME server 105 receives one or more comparison results including media-identifying information from the census system 112 (bock 406). The example instructions of FIG. 4 end.

FIG. 5 is a flowchart representative of example machine readable instructions and/or example operations 500 that may be executed and/or instantiated by processor circuitry to implement the census impression controller 114 of FIGS. 1A, 1B, and 2 to confirm census impression records corresponding to AME panelists. The program of FIG. 5 begins at block 502 at which the example network interface circuitry 130 (FIGS. 1A and 1B) receives a census impression request via a network communication through the network 140 from the client device 102. The example data interface circuitry 132 (FIGS. 1A and 1B) logs the census impression request in a census impression record (block 504). The example data interface circuitry 132 can store the census impression record in a data store or memory.

The example network interface circuitry 130 receives a match query and panelist impression information in one or more network communications through the network 140 (block 506). For example, panelist impression information received by the network interface circuitry 130 includes a public IP address, a timestamp, a panelist identifier (PanelistID) and/or device identifier (DeviceID, MobileID, etc.) corresponding to the user of the panelist client device 102. In the illustrated example, the network interface circuitry 130 receives the match query and the panelist impression information of the panelist client device 102 hours or days after logging the census impression request at block 504 for the panelist client device 102. In other examples, the network interface circuitry 130 receives the match query and the panelist impression information of the panelist client device 102 sooner such as seconds or minutes after logging the census impression request at block 504 for the panelist client device 102. In any case, the example network interface circuitry 130 may receive one or more other census impression requests from the same or other client devices for logging in impression records before receiving the match query and panelist impression information at block 506.

The example comparator circuitry 134 (FIGS. 1A and 1B) compares public IP addresses of the panelist impression information and census impression records logged by the census system 112 (block 508). For example, the comparator circuitry 134 compares a first public IP address of a panelist impression record represented by the panelist impression information with one or more second public IP addresses of one or more census impression records. The example comparator circuitry 134 compares timestamps of the panelist impression records and census impression records (block 510). For example, the comparator circuitry 134 compares a first timestamp of the panelist impression record represented by the panelist impression information with one or more second timestamps of one or more census impression records. The example comparator circuitry 134 determines whether a census impression record corresponds to a panelist impression record (block 512). For example, the comparator circuitry 134 determines based on the comparisons at block 508 and 510 whether any of the one or more census impression records matches the panelist impression information corresponding to the panelist impression record of the AME. For example, a census impression record having a matching public IP address and a substantially matching timestamp with panelist impression information of a panelist impression record are regarded as corresponding to the same media impression event at the panelist client device 102. In some examples, performing the timestamp comparison at block 510 to find such a match may include determining a difference between the first timestamp and the second timestamp is less than a threshold value. The threshold value may be specified by the example AME meter collection system 110 or the example census system 112 to represent an acceptable (e.g., negligible) difference (e.g., less than one millisecond, less than 10 milliseconds, less than one second, etc.) in time between timestamps of a logged census impression and a logged panelist impression such that both of the logged census and panelist impressions can be regarded as corresponding to the same media impression event at the panelist client device 102.

In some examples, multiple census impression records may be found to match a single panelist impression record at block 512. As only one census impression record corresponds to a single panelist impression record, a resolution strategy may be used to identify a correct census impression record corresponding to a panelist impression record and, thus, identify media accessed by the panelist corresponding to the panelist impression record. For example, a private IP address comparison may be performed between the panelist impression record and multiple census impression records to identify one of the census impression records corresponding to the particular device in a private network (e.g., a household or business) having the same private IP address located in the panelist impression record. In addition to using a private IP address, or instead of using private IP address comparisons (e.g., if a public IP address is not available), examples disclosed herein may analyze temporal proximity between a timestamp of a panelist impression record and timestamps of multiple census impression records. In this manner, the comparator circuitry 134 determines that the census impression record having a timestamp that is closest in temporal proximity to a timestamp of the panelist impression record is the one of the multiple census impression records that corresponds to the panelist impression record. In some examples, if a one-to-one match between a panelist impression record and a corresponding census impression record cannot be found, the comparator circuitry 134 can mark the panelist impression record as unmatchable. Alternatively, the comparator circuitry 134 can discard (e.g., throw away) the unmatchable panelist impression record.

When the example comparator circuitry 134 determines at block 512 that a census impression record corresponds to the panelist impression record, the example comparator circuitry 134 and/or the example data interface circuitry 132 generates comparison result information that includes: (1) the panelist impression information, and (2) the media-identifying information from the matching census impression record (block 514). For example, the panelist impression information provided in the comparison result information may be the public IP address, the timestamp, and/or any other information from the panel impression record that could be used by the AME server 105 to associate the media-identifying information with the corresponding panel impression record and, thus, the corresponding panelist and panelist demographics associated with the panelist client device 102. The example network interface circuitry 130 sends the comparison result information indicative of the matching census impression record to the AME meter collection system 110 (block 516). The comparison result is indicative of a match confirming a census impression record corresponding to the panelist impression record of the AME and includes the media-identifying information for use by the AME server 105 to generate demographic-based audience metrics for corresponding media based on the panel impression records and panelist demographics maintained by the AME meter collection system 110. Example demographic-based audience metrics include total impression counts (e.g., the total number of times a media item was accessed via one or more client devices) and/or unique audience sizes (e.g., the unique number of audience members that accessed a media item). Additionally or alternatively, other types of audience metrics may also be determined.

When the example comparator circuitry 134 determines at block 512 that none of the census impression records corresponds to the panelist impression record, the example network interface circuitry 130 sends a no-match comparison result to the AME meter collection system 110 (block 518). After block 516 or block 518, the instructions of FIG. 5 end. However, the instructions of FIG. 5 may be executed multiple times to log additional census impression requests and/or service additional match queries from the AME meter collection system 110.

Figure 6:
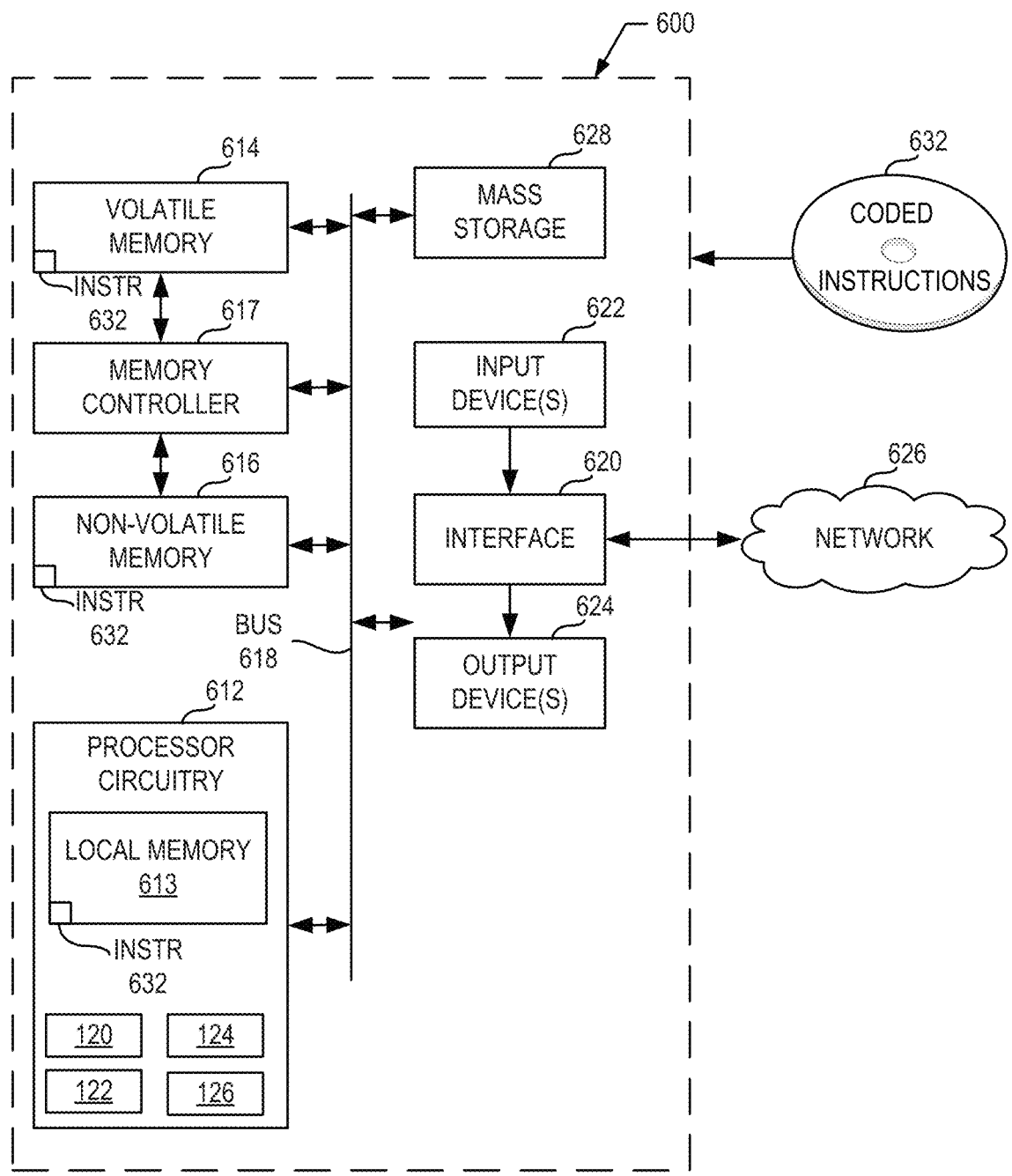
FIG. 6 is a block diagram of an example processing platform including processor circuitry structured to execute the example machine readable instructions of FIGS. 3 and 4 to implement the example on-device meter of FIGS. 1A, 1B, and 2 to log panelist media impressions and to send census impression requests of census media impressions to the census system of FIGS. 1A, 1B, and 2.

FIG. 6. is a block diagram of an example processor platform 600 structured to execute and/or instantiate the machine readable instructions and/or operations of FIGS. 3 and 4 to implement the example on-device meter 104 of FIGS. 1A, 1B, and 2. The processor platform 600 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 600 of the illustrated example includes processor circuitry 612. The processor circuitry 612 of the illustrated example is hardware. For example, the processor circuitry 612 can be implemented by one or more integrated circuits, logic circuits, FPGAs microprocessors, CPUs, GPUs, DSPs, and/or microcontrollers from any desired family or manufacturer. The processor circuitry 612 may be implemented by one or more semiconductor based (e.g., silicon based) devices. In this example, the processor circuitry 612 implements the example network interface circuitry 120, the example packet detector circuitry 122, the example data collector circuitry 124, and the example data logger circuitry 126 of FIGS. 1A and 1B.

The processor circuitry 612 of the illustrated example includes a local memory 613 (e.g., a cache, registers, etc.). The processor circuitry 612 of the illustrated example is in communication with a main memory including a volatile memory 614 and a non-volatile memory 616 by a bus 618. The volatile memory 614 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 616 may be implemented by flash memory and/or any other desired type of memory device. Access to the main memory 614, 616 of the illustrated example is controlled by a memory controller 617.

The processor platform 600 of the illustrated example also includes interface circuitry 620. The interface circuitry 620 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 622 are connected to the interface circuitry 620. The input device(s) 622 permit(s) a user to enter data and/or commands into the processor circuitry 612. The input device(s) 622 can be implemented by, for example, an audio sensor, a microphone, a camera (still or video), a keyboard, a button, a mouse, a touchscreen, a track-pad, a trackball, an isopoint device, and/or a voice recognition system.

One or more output devices 624 are also connected to the interface circuitry 620 of the illustrated example. The output devices 624 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 620 of the illustrated example, thus, typically includes a graphics driver card, a graphics driver chip, and/or graphics processor circuitry such as a GPU.

The interface circuitry 620 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 626. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 600 of the illustrated example also includes one or more mass storage devices 628 to store software and/or data. Examples of such mass storage devices 628 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 632, which may be implemented by the machine readable instructions of FIGS. 3 and 4, may be stored in the mass storage device 628, in the volatile memory 614, in the non-volatile memory 616, and/or on a removable non-transitory computer readable storage medium such as a CD or DVD.

Figure 7:
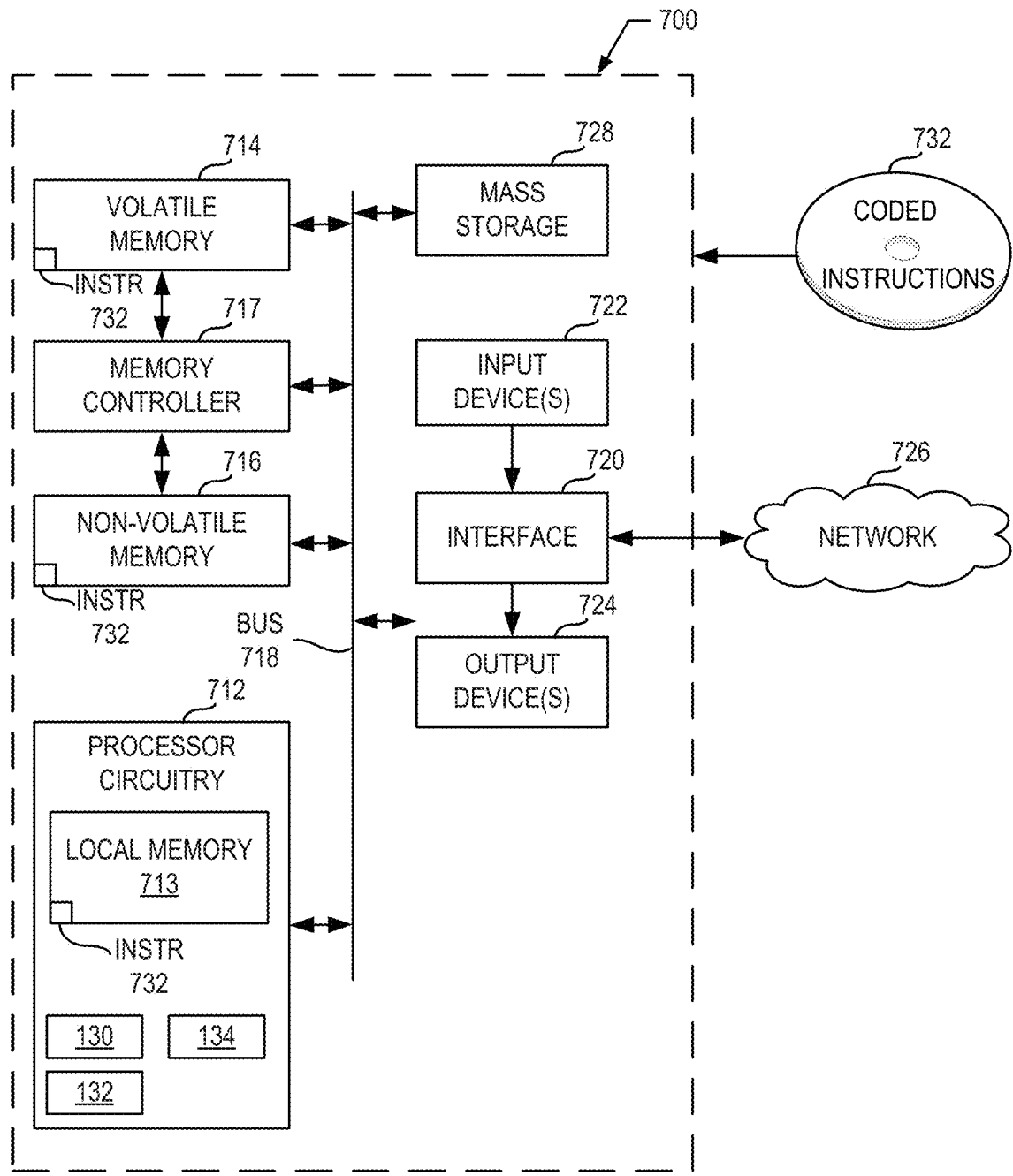
FIG. 7 is a block diagram of an example processing platform including processor circuitry structured to execute the instructions of FIG. 5 to implement the example census impression controller of FIGS. 1A, 1B, and 2 to confirm census impression records corresponding to panelist impression records of the AME.

FIG. 7. is a block diagram of an example processor platform 700 structured to execute and/or instantiate the machine readable instructions and/or operations of FIG. 5 to implement example census impression controller 114 of FIGS. 1A, 1B, and 2. The processor platform 700 can be, for example, a server, a personal computer, a workstation, a self-learning machine (e.g., a neural network), an Internet appliance, or any other type of computing device.

The processor platform 700 of the illustrated example includes processor circuitry 712. The processor circuitry 712 of the illustrated example is hardware. For example, the processor circuitry 712 can be implemented by one or more integrated circuits, logic circuits, FPGAs microprocessors, CPUs, GPUs, DSPs, and/or microcontrollers from any desired family or manufacturer. The processor circuitry 712 may be implemented by one or more semiconductor based (e.g., silicon based) devices. In this example, the processor circuitry 712 implements the example network interface circuitry 130, the example data interface circuitry 132, and the example comparator circuitry 134 of FIGS. 1A and 1B.

The processor circuitry 712 of the illustrated example includes a local memory 713 (e.g., a cache, registers, etc.). The processor circuitry 712 of the illustrated example is in communication with a main memory including a volatile memory 714 and a non-volatile memory 716 by a bus 718. The volatile memory 714 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 716 may be implemented by flash memory and/or any other desired type of memory device. Access to the main memory 714, 716 of the illustrated example is controlled by a memory controller 717. In some examples, one or both of the volatile memory 714 or the non-volatile memory 716 implement the data storage circuitry 136 of FIGS. 1A and 1B.

The processor platform 700 of the illustrated example also includes interface circuitry 720. The interface circuitry 720 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 722 are connected to the interface circuitry 720. The input device(s) 722 permit(s) a user to enter data and/or commands into the processor circuitry 712. The input device(s) 722 can be implemented by, for example, an audio sensor, a microphone, a camera (still or video), a keyboard, a button, a mouse, a touchscreen, a track-pad, a trackball, an isopoint device, and/or a voice recognition system.

One or more output devices 724 are also connected to the interface circuitry 720 of the illustrated example. The output devices 724 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 720 of the illustrated example, thus, typically includes a graphics driver card, a graphics driver chip, and/or graphics processor circuitry such as a GPU.

The interface circuitry 720 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 726. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 700 of the illustrated example also includes one or more mass storage devices 728 to store software and/or data. Examples of such mass storage devices 728 include magnetic storage devices, optical storage devices, floppy disk drives, HDDs, CDs, Blu-ray disk drives, redundant array of independent disks (RAID) systems, solid state storage devices such as flash memory devices, and DVD drives. In some examples, the mass storage device(s) 728 may implement the example data storage circuitry 136 of FIGS. 1A and 1B.

Machine executable instructions 732 representative of the machine readable instructions of FIG. 5 may be stored in the mass storage device 728, in the volatile memory 714, in the non-volatile memory 716, and/or on a removable non-transitory computer readable storage medium such as a CD or DVD.

Figure 8:
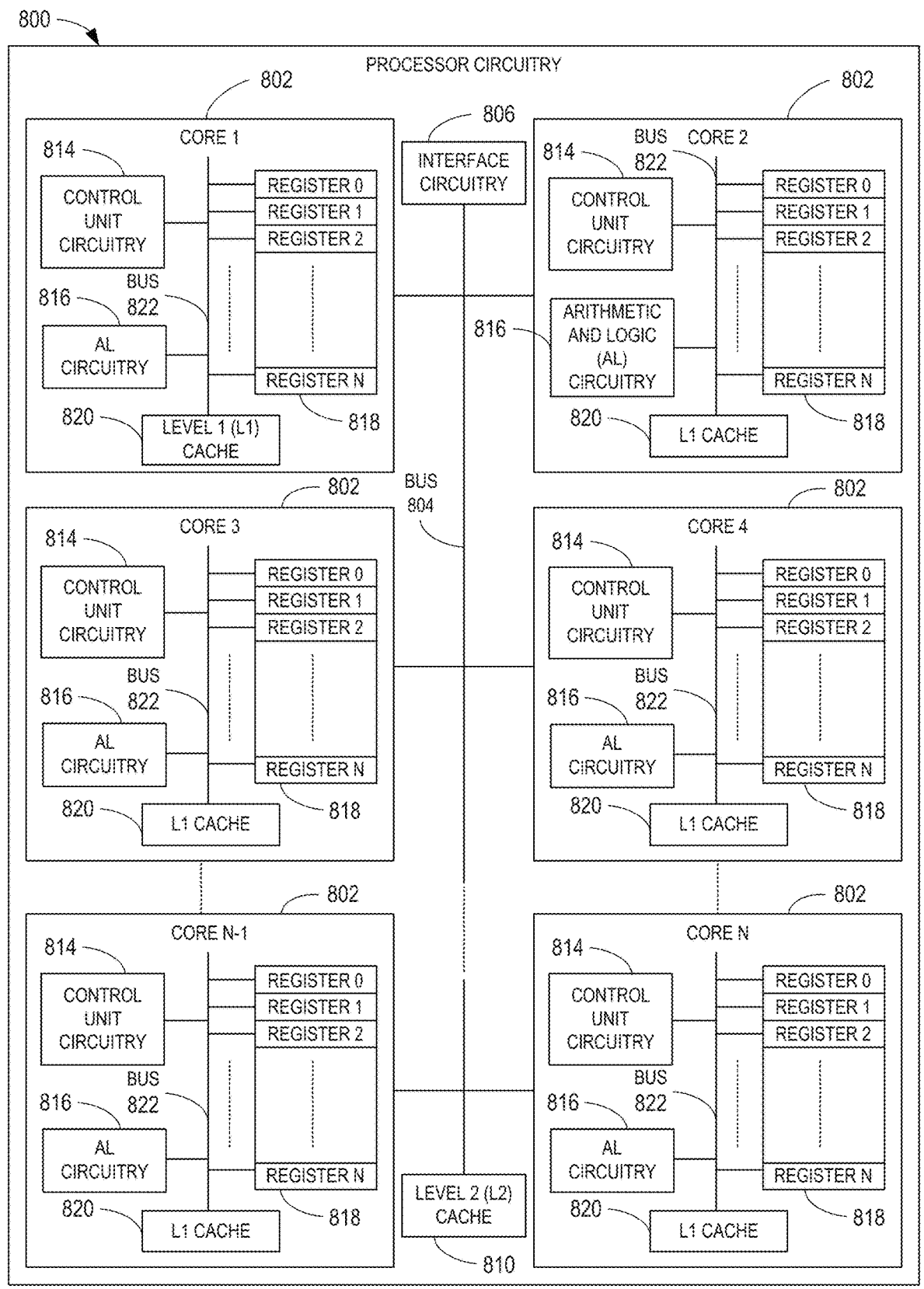
FIG. 8 is a block diagram of an example implementation of processor circuitry that may be used to implement the example processing platforms of FIGS. 6-7.

FIG. 8 is a block diagram of an example implementation of the processor circuitry 612, 712 of FIGS. 6 and 7. In this example, the processor circuitry 612, 712 of FIGS. 6 and 7 is implemented by a microprocessor 800. For example, the microprocessor 800 may implement multi-core hardware circuitry such as a CPU, a DSP, a GPU, an XPU, etc. Although it may include any number of example cores 802 (e.g., 1 core), the microprocessor 800 of this example is a multi-core semiconductor device including N cores. The cores 802 of the microprocessor 800 may operate independently or may cooperate to execute machine readable instructions. For example, machine code corresponding to a firmware program, an embedded software program, or a software program may be executed by one of the cores 802 or may be executed by multiple ones of the cores 802 at the same or different times. In some examples, the machine code corresponding to the firmware program, the embedded software program, or the software program is split into threads and executed in parallel by two or more of the cores 802. The software program may correspond to a portion or all of the machine readable instructions and/or operations represented by the flowcharts of FIGS. 3-5.

The cores 802 may communicate by an example bus 804. In some examples, the bus 804 may implement a communication bus to effectuate communication associated with one(s) of the cores 802. For example, the bus 804 may implement at least one of an Inter-Integrated Circuit (I2C) bus, a Serial Peripheral Interface (SPI) bus, a PCI bus, or a PCIe bus. Additionally or alternatively, the bus 804 may implement any other type of computing or electrical bus. The cores 802 may obtain data, instructions, and/or signals from one or more external devices by example interface circuitry 806. The cores 802 may output data, instructions, and/or signals to the one or more external devices by the interface circuitry 806. Although the cores 802 of this example include example local memory 820 (e.g., Level 1 (L1) cache that may be split into an L1 data cache and an L1 instruction cache), the microprocessor 800 also includes example shared memory 810 that may be shared by the cores (e.g., Level 2 (L2_cache)) for high-speed access to data and/or instructions. Data and/or instructions may be transferred (e.g., shared) by writing to and/or reading from the shared memory 810. The local memory 820 of each of the cores 802 and the shared memory 810 may be part of a hierarchy of storage devices including multiple levels of cache memory and the main memory (e.g., the main memory 614, 616, 714, 716 of FIGS. 6-7). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 802 may be referred to as a CPU, DSP, GPU, etc., or any other type of hardware circuitry. Each core 802 includes control unit circuitry 814, arithmetic and logic (AL) circuitry (sometimes referred to as an ALU) 816, a plurality of registers 818, the L1 cache 820, and an example bus 822. Other structures may be present. For example, each core 802 may include vector unit circuitry, single instruction multiple data (SIMD) unit circuitry, load/store unit (LSU) circuitry, branch/jump unit circuitry, floating-point unit (FPU) circuitry, etc. The control unit circuitry 814 includes semiconductor-based circuits structured to control (e.g., coordinate) data movement within the corresponding core 802. The AL circuitry 816 includes semiconductor-based circuits structured to perform one or more mathematic and/or logic operations on the data within the corresponding core 802. The AL circuitry 816 of some examples performs integer based operations. In other examples, the AL circuitry 816 also performs floating point operations. In yet other examples, the AL circuitry 816 may include first AL circuitry that performs integer based operations and second AL circuitry that performs floating point operations. In some examples, the AL circuitry 816 may be referred to as an Arithmetic Logic Unit (ALU). The registers 818 are semiconductor-based structures to store data and/or instructions such as results of one or more of the operations performed by the AL circuitry 816 of the corresponding core 802. For example, the registers 818 may include vector register(s), SIMD register(s), general purpose register(s), flag register(s), segment register(s), machine specific register(s), instruction pointer register(s), control register(s), debug register(s), memory management register(s), machine check register(s), etc. The registers 818 may be arranged in a bank as shown in FIG. 5. Alternatively, the registers 818 may be organized in any other arrangement, format, or structure including distributed throughout the core 802 to shorten access time. The bus 820 may implement at least one of an I2C bus, a SPI bus, a PCI bus, or a PCIe bus Each core 802 and/or, more generally, the microprocessor 800 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 800 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 9:
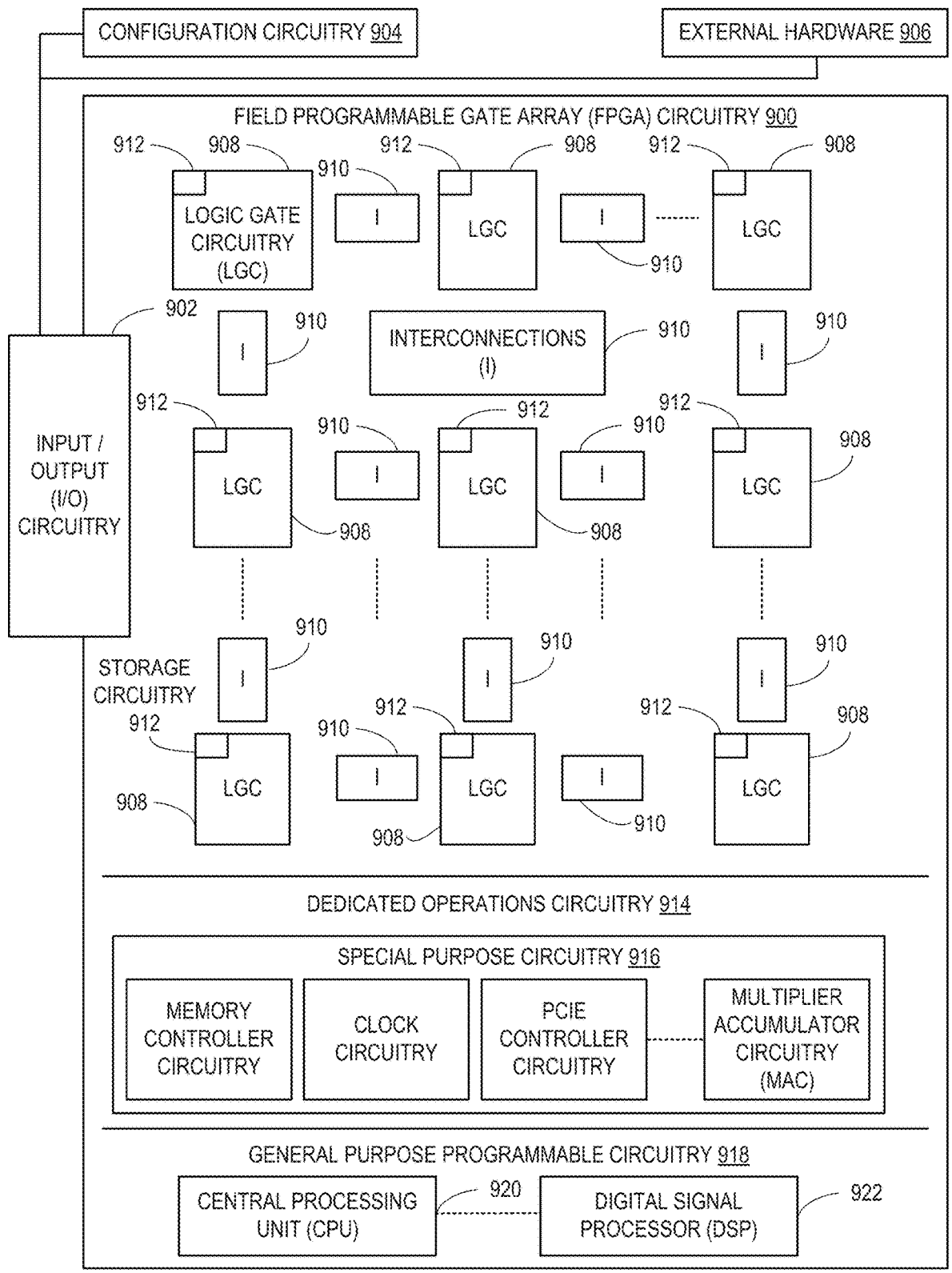
FIG. 9 is a block diagram of another example implementation of processor circuitry that may be used to implement the example processing platforms of FIGS. 6-7.

FIG. 9 is a block diagram of another example implementation of the processor circuitry 612, 712 of FIGS. 6-7. In this example, the processor circuitry 612, 712 is implemented by FPGA circuitry 900. The FPGA circuitry 900 can be used, for example, to perform operations that could otherwise be performed by the example microprocessor 612, 712 of FIGS. 6-7 executing corresponding machine readable instructions. However, once configured, the FPGA circuitry 900 instantiates the machine readable instructions in hardware and, thus, can often execute the operations faster than they could be performed by a general purpose microprocessor executing the corresponding software.

More specifically, in contrast to the microprocessor 600, 700 of FIGS. 6-7 described above (which is a general purpose device that may be programmed to execute some or all of the machine readable instructions represented by the flowchart of FIGS. 3-5 but whose interconnections and logic circuitry are fixed once fabricated), the FPGA circuitry 900 of the example of FIG. 9 includes interconnections and logic circuitry that may be configured and/or interconnected in different ways after fabrication to instantiate, for example, some or all of the machine readable instructions represented by the flowcharts of FIGS. 3-5. In particular, the FPGA 900 may be thought of as an array of logic gates, interconnections, and switches. The switches can be programmed to change how the logic gates are interconnected by the interconnections, effectively forming one or more dedicated logic circuits (unless and until the FPGA circuitry 900 is reprogrammed). The configured logic circuits enable the logic gates to cooperate in different ways to perform different operations on data received by input circuitry. Those operations may correspond to some or all of the software represented by the flowchart of FIGS. 3-5. As such, the FPGA circuitry 900 may be structured to effectively instantiate some or all of the machine readable instructions of the flowchart of FIGS. 3-5 as dedicated logic circuits to perform the operations corresponding to those software instructions in a dedicated manner analogous to an ASIC. Therefore, the FPGA circuitry 900 may perform the operations corresponding to the some or all of the machine readable instructions of FIGS. 3-5 faster than the general purpose microprocessor can execute the same.

In the example of FIG. 9, the FPGA circuitry 900 is structured to be programmed (and/or reprogrammed one or more times) by an end user by a hardware description language (HDL) such as Verilog. The FPGA circuitry 900 of FIG. 9, includes example input/output (I/O) circuitry 902 to obtain and/or output data to/from example configuration circuitry 904 and/or external hardware (e.g., external hardware circuitry) 906. For example, the configuration circuitry 904 may implement interface circuitry that may obtain machine readable instructions to configure the FPGA circuitry 900, or portion(s) thereof. In some such examples, the configuration circuitry 904 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 906 may implement the microprocessors 600, 700 of FIGS. 6-7. The FPGA circuitry 900 also includes an array of example logic gate circuitry 908, a plurality of example configurable interconnections 910, and example storage circuitry 912. The logic gate circuitry 908 and interconnections 910 are configurable to instantiate one or more operations that may correspond to at least some of the machine readable instructions of FIGS. 3-5 and/or other desired operations. The logic gate circuitry 908 shown in FIG. 9 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 908 to enable configuration of the electrical structures and/or the logic gates to form circuits to perform desired operations.

The logic gate circuitry 908 may include other electrical structures such as look-up tables (LUTs), registers (e.g., flip-flops or latches), multiplexers, etc.

The interconnections 910 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 908 to program desired logic circuits.

The storage circuitry 912 of the illustrated example is structured to store result(s) of the one or more of the operations performed by corresponding logic gates. The storage circuitry 912 may be implemented by registers or the like. In the illustrated example, the storage circuitry 912 is distributed amongst the logic gate circuitry 908 to facilitate access and increase execution speed.

The example FPGA circuitry 900 of FIG. 9 also includes example Dedicated Operations Circuitry 914. In this example, the Dedicated Operations Circuitry 914 includes special purpose circuitry 916 that may be invoked to implement commonly used functions to avoid the need to program those functions in the field. Examples of such special purpose circuitry 916 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 900 may also include example general purpose programmable circuitry 918 such as an example CPU 920 and/or an example DSP 922. Other general purpose programmable circuitry 918 may additionally or alternatively be present such as a GPU, an XPU, etc., that can be programmed to perform other operations.

Although FIGS. 8 and 9 illustrate two example implementations of the processor circuitry 612, 712 of FIGS. 6-7, many other approaches are contemplated. For example, as mentioned above, modern FPGA circuitry may include an on-board CPU, such as one or more of the example CPU 920 of FIG. 9. Therefore, the processor circuitry 612, 712 of FIGS. 6-7 may additionally be implemented by combining the example microprocessors 600, 700 of FIGS. 6-7 and the example FPGA circuitry 900 of FIG. 9. In some such hybrid examples, a first portion of the machine readable instructions represented by the flowchart of FIGS. 3-5 may be executed by one or more of the cores 802 of FIG. 8 and a second portion of the machine readable instructions represented by the flowchart of FIGS. 3-5 may be executed by the FPGA circuitry 900 of FIG. 9.

In some examples, the processor circuitry 812 of FIG. 8 may be in one or more packages. For example, the processor circuitry 800 of FIG. 8 and/or the FPGA circuitry 900 of FIG. 9 may be in one or more packages. In some examples, an XPU may be implemented by the processor circuitry 912 of FIG. 9, which may be in one or more packages. For example, the XPU may include a CPU in one package, a DSP in another package, a GPU in yet another package, and an FPGA in still yet another package.

Figure 10:
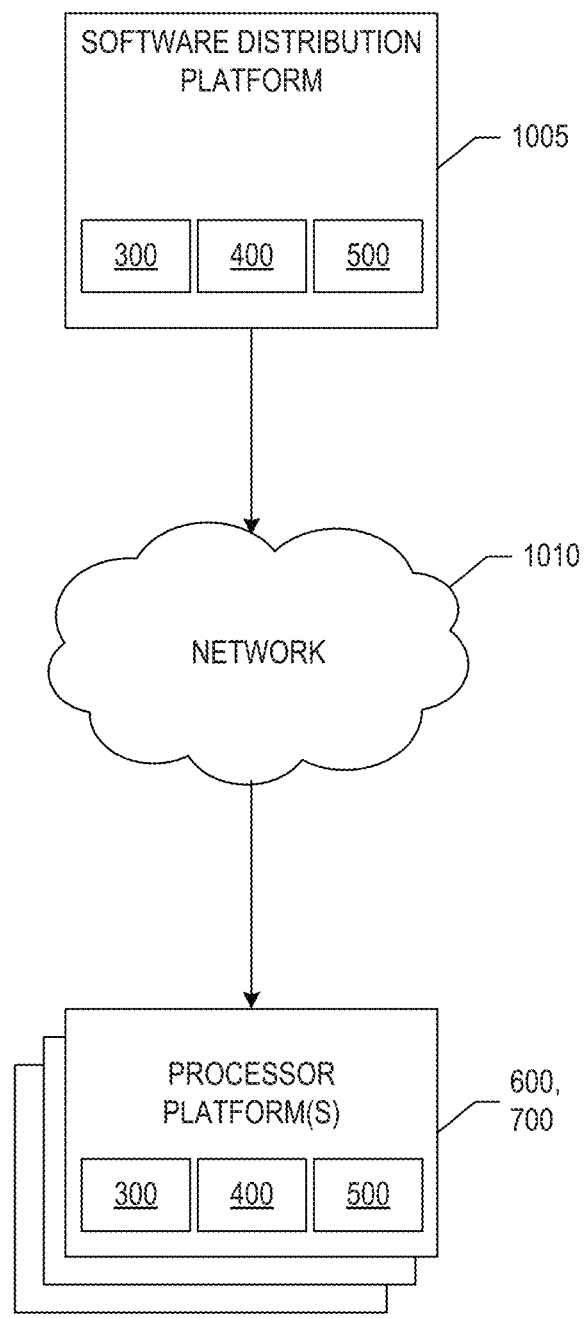
FIG. 10 is a block diagram of an example software distribution platform to distribute software (e.g., software corresponding to the example computer readable instructions of FIGS. 3-5) to devices such as consumers (e.g., for license, sale and/or use), retailers (e.g., for sale, re-sale, license, and/or sub-license), and/or original equipment manufacturers (OEMs) (e.g., for inclusion in products to be distributed to, for example, retailers and/or to direct buy customers).

A block diagram illustrating an example software distribution platform 1005 to distribute software such as the example computer readable instructions 300 of FIG. 3, the example computer readable instructions 400 of FIG. 4, and the example computer readable instructions 500 of FIG. 5 to provide the on-device meter 104 to client devices is illustrated in FIG. 10. The example software distribution platform 1005 may be implemented by any computer server, data facility, cloud service, etc., capable of storing and transmitting software to other computing devices. The entity that owns and/or operates the software distribution platform may be a developer, a seller, and/or a licensor of software such as the example computer readable instructions 300, 400, 500 of FIGS. 3-5. The third parties may be consumers, users, retailers, OEMs, etc., who purchase and/or license the software for use and/or re-sale and/or sub-licensing. In the illustrated example, the software distribution platform 1005 includes one or more servers and one or more storage devices. The storage devices store the example computer readable instructions 300, 400, and 500, which may correspond to the example computer readable instructions represented in FIGS. 3-5, as described above. The one or more servers of the example software distribution platform 1005 are in communication with a network 1010, which may correspond to any one or more of the Internet and/or any of the example networks described above. In some examples, the one or more servers are responsive to requests to transmit the software to a requesting party as part of a commercial transaction. Payment for the delivery, sale and/or license of the software may be handled by the one or more servers of the software distribution platform and/or via a third party payment entity. The servers enable purchasers and/or licensors to download the computer readable instructions 300, 400, and 500 from the software distribution platform 1005. For example, the software, which may correspond to the example computer readable instructions 300, 400, 500 of FIGS. 3-5, may be downloaded to the example processor platform(s) 600 and 700, which is to execute the computer readable instructions 300, 400, and 500 to implement the example on-device meter 104 and/or the example census impression controller 114 and/or the example AME server 105 of FIGS. 1A, 1B, and 2. In some examples, one or more servers of the software distribution platform 1005 periodically offer, transmit, and/or force updates to the software (e.g., the example computer readable instructions 300, 400, 500 of FIGS. 3-5) to ensure improvements, patches, updates, etc. are distributed and applied to the software at the end user devices.

From the foregoing, it will be appreciated that example methods, apparatus and articles of manufacture have been disclosed that perform network-based monitoring of media access activities. The disclosed methods, apparatus and articles of manufacture improve the efficiency of using a computing device by providing public IP addresses and timestamps in census impression requests and in panelist impression information that can be used by a computer to identify logged census impression records and media-identifying information in the census impression records that correspond to media accessed by panelist audience members. In this manner, a computer can definitively identify panelist audience members and corresponding media for which census impressions are logged while preserving panelist privacy (e.g., protecting PII information of panelists). The disclosed methods, apparatus and articles of manufacture are accordingly directed to one or more improvement(s) in the functioning of a computer.

Example methods, apparatus, systems, and articles of manufacture to perform network-based monitoring of media access activities are disclosed herein. Further examples and combinations thereof include the following:

Example 1 includes an apparatus comprising at least one memory, instructions in the apparatus, and processor circuitry to execute the instructions to determine whether a census impression record corresponds to a panelist impression record by comparing a first internet protocol (IP) address of the panelist impression record with a second IP address of the census impression record, and comparing a first timestamp of the panelist impression record with a second timestamp of the census impression record, and send a comparison result to a computer of an audience measurement entity, the comparison result indicative of a match confirming the census impression record corresponds to the panelist impression record of the audience measurement entity.

Example 2 includes the apparatus of example 1, wherein the processor circuitry is to execute the instructions to determine whether the census impression record corresponds to the panelist impression record by determining whether a difference between the first timestamp and the second timestamp is less than a threshold value.

Example 3 includes the apparatus of example 1, wherein the processor circuitry is to log the census impression record based on a census impression request received in a hypertext transfer protocol secure request, and access the first IP address and the first timestamp from the hypertext transfer protocol secure request.

Example 4 includes the apparatus of example 1, wherein the first IP address is a public IP address, the processor circuitry to execute the instructions to access the first public IP address and a private IP address from the panelist impression record.

Example 5 includes the apparatus of example 1, wherein the processor circuitry is to execute the instructions to log the census impression record based on a census impression request received via a network communication from a client device.

Example 6 includes the apparatus of example 1, wherein the processor circuitry is to execute the instructions to log the census impression record based on a census impression request received as a hypertext transfer protocol secure request.

Example 7 includes a non-transitory computer readable medium comprising instructions, which, when executed, cause processor circuitry to at least determine whether a census impression record corresponds to a panelist impression record by comparing a first internet protocol (IP) address of the panelist impression record with a second IP address of the census impression record, and comparing a first timestamp of the panelist impression record with a second timestamp of the census impression record, and send a comparison result to a computer of an audience measurement entity, the comparison result indicative of a match confirming the census impression record corresponds to the panelist impression record of the audience measurement entity.

Example 8 includes the non-transitory computer readable medium of example 7, wherein the instructions, when executed, cause the processor circuitry to determine whether the census impression record corresponds to the panelist impression record by determining whether a difference between the first timestamp and the second timestamp is less than a threshold value.

Example 9 includes the non-transitory computer readable medium of example 7, wherein the instructions, when executed, cause the processor circuitry to log the census impression record based on a census impression request received in a hypertext transfer protocol secure request, and access the first IP address and the first timestamp from the hypertext transfer protocol secure request.

Example 10 includes the non-transitory computer readable medium of example 7, wherein the first IP address is a first public IP address, the instructions, when executed, cause the processor circuitry to access the first public IP address and a private IP address from the panelist impression record.

Example 11 includes the non-transitory computer readable medium of example 7, wherein the instructions, when executed, cause the processor circuitry to log the census impression record based on a census impression request received via a network communication from a client device.

Example 12 includes the non-transitory computer readable medium of example 7, wherein the instructions, when executed, cause the processor circuitry to log the census impression record based on a census impression request received as a hypertext transfer protocol secure request.

Example 13 includes a method comprising determining, by executing an instruction with a processor, whether a census impression record corresponds to a panelist impression record by comparing, by executing an instruction with the processor, a first internet protocol (IP) address of the panelist impression record with a second IP address of the census impression record, and comparing, by executing an instruction with the processor, a first timestamp of the panelist impression record with a second timestamp of the census impression record, and sending, by executing an instruction with the processor, a comparison result to a computer of an audience measurement entity, the comparison result indicative of a match confirming the census impression record corresponds to the panelist impression record of the audience measurement entity.

Example 14 includes the method of example 13, further including determining whether the census impression record corresponds to the panelist impression record by determining whether a difference between the first timestamp and the second timestamp is less than a threshold value.

Example 15 includes the method of example 13, further including logging the census impression record based on a census impression request received in a hypertext transfer protocol secure request, and accessing the first IP address and the first timestamp from the hypertext transfer protocol secure request.

Example 16 includes the method of example 13, wherein the first IP address is a public IP address, and further including accessing the first public IP address and a private IP address from the panelist impression record.

Example 17 includes the method of example 13, further including logging the census impression record based on a census impression request received via a network communication from a client device.

Example 18 includes the method of example 13, further including logging the census impression record based on a census impression request received as a hypertext transfer protocol secure request.

Example 19 includes an apparatus comprising at least one memory, instructions in the apparatus, and processor circuitry to execute the instructions to obtain an internet protocol (IP) address and a timestamp in response to a census impression request indicating a media access on a client device, store the IP address and the timestamp in a panelist impression record in association with a panelist identifier, the panelist identifier corresponding to a panelist audience member of an audience measurement entity, send the census impression request to a census system, and send the panelist impression record to a meter collection system.

Example 20 includes the apparatus of example 19, wherein the processor circuitry is to execute the instructions to generate the census impression request in response to the client device accessing media via at least one of a website or an app.

Example 21 includes the apparatus of example 19, wherein the processor circuitry is to execute the instructions to intercept the census impression request by intercepting a hypertext transfer protocol secure request from at least one of a web browser or an app.

Example 22 includes the apparatus of example 19, wherein the processor circuitry is to execute the instructions to detect the census impression request based on a domain name in a uniform resource locator of the census impression request.

Example 23 includes the apparatus of example 19, wherein the IP address is a public IP address, the processor circuitry to execute the instructions to include a private IP address of the client device in the panelist impression record.

Example 24 includes the apparatus of example 19, wherein the processor circuitry is to execute the instructions to send the panelist impression record to the meter collection system by sending a log file that includes the panelist impression record and a plurality of second panelist impression records to the meter collection system.

Example 25 includes the apparatus of example 24, wherein the processor circuitry is to execute the instructions to send the log file to the meter collection system at intervals specified by the audience measurement entity.

Example 26 includes a non-transitory computer readable medium comprising instructions, which, when executed, cause processor circuitry to at least obtain an internet protocol (IP) address and a timestamp in response to a census impression request indicating a media access on a client device, store the IP address and the timestamp in a panelist impression record in association with a panelist identifier, the panelist identifier corresponding to a panelist audience member of an audience measurement entity, send the census impression request to a census system, and send the panelist impression record to a meter collection system.

Example 27 includes the non-transitory computer readable medium of example 26, wherein the instructions, when executed, cause the processor circuitry to generate the census impression request in response to the client device accessing media via at least one of a website or an app.

Example 28 includes the non-transitory computer readable medium of example 26, wherein the instructions, when executed, cause the processor circuitry to intercept the census impression request by intercepting a hypertext transfer protocol secure request from at least one of a web browser or an app.

Example 29 includes the non-transitory computer readable medium of example 26, wherein the instructions, when executed, cause the processor circuitry to detect the census impression request based on a domain name in a uniform resource locator of the census impression request.

Example 30 includes the non-transitory computer readable medium of example 26, wherein the IP address is a public IP address, the instructions, when executed, cause the processor circuitry to include a private IP address of the client device in the panelist impression record.

Example 31 includes the non-transitory computer readable medium of example 26, wherein the instructions, when executed, cause the processor circuitry to send the panelist impression record to the meter collection system by sending a log file that includes the panelist impression record and a plurality of second panelist impression records to the meter collection system.

Example 32 includes the non-transitory computer readable medium of example 31, wherein the instructions, when executed, cause the processor circuitry to send the log file to the meter collection system at intervals specified by the audience measurement entity.

Example 33 includes a method comprising obtaining, by executing an instruction with a processor, an internet protocol (IP) address and a timestamp in response to a census impression request indicating a media access on a client device, storing, by executing an instruction with the processor, the IP address and the timestamp in a panelist impression record in association with a panelist identifier, the panelist identifier corresponding to a panelist audience member of an audience measurement entity, sending, by executing an instruction with the processor, the census impression request to a census system, and sending, by executing an instruction with the processor, the panelist impression record to a meter collection system.

Example 34 includes the method of example 33, further including generating the census impression request in response to the client device accessing media via at least one of a website or an app.

Example 35 includes the method of example 33, further including intercepting the census impression request by intercepting a hypertext transfer protocol secure request from at least one of a web browser or an app.

Example 36 includes the method of example 33, further including detecting the census impression request based on a domain name in a uniform resource locator of the census impression request.

Example 37 includes the method of example 33, wherein the IP address is a public IP address, and further including logging a private IP address of the client device in the panelist impression record.

Example 38 includes the method of example 33 further including sending the panelist impression record to the meter collection system by sending a log file that includes the panelist impression record and a plurality of second panelist impression records to the meter collection system.

Example 39 includes the method of example 38, further including sending the log file to the meter collection system at intervals specified by the audience measurement entity.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:
1. An apparatus comprising:
at least one memory;
instructions in the apparatus; and
processor circuitry to execute the instructions to:
determine whether a census impression record corresponds to a panelist impression record by:
comparing a first public internet protocol (IP) address of the panelist impression record with a second public IP address of the census impression record to identify a household;
comparing a first private IP address of the panelist impression record with a second private IP address of the census impression record to identify a device in the household; and
comparing a first timestamp of the panelist impression record with a second timestamp of the census impression record; and
send a comparison result to a computer of an audience measurement entity, the comparison result indicative of a match confirming the census impression record corresponds to the panelist impression record of the audience measurement entity.

2. The apparatus of claim 1, wherein the processor circuitry is to execute the instructions to determine whether the census impression record corresponds to the panelist impression record by determining whether a difference between the first timestamp and the second timestamp is less than a threshold value.

3. The apparatus of claim 1, wherein the processor circuitry is to execute the instructions to:
   log the census impression record based on a census impression request received in a hypertext transfer protocol secure request, and
   access the first public IP address and the first timestamp from the hypertext transfer protocol secure request.

4. The apparatus of claim 1, wherein the processor circuitry is to execute the instructions to access the first public IP address and the first private IP address from the panelist impression record.

5. The apparatus of claim 1, wherein the processor circuitry is to execute the instructions to log the census impression record based on a census impression request received via a network communication from a client device.

6. The apparatus of claim 1, wherein the processor circuitry is to execute the instructions to log the census impression record based on a census impression request received as a hypertext transfer protocol secure request.

7. A non-transitory computer readable medium comprising instructions, which, when executed, cause processor circuitry to at least:
   determine whether a census impression record corresponds to a panelist impression record by:
      comparing a first public internet protocol (IP) address of the panelist impression record with a second public IP address of the census impression record to identify a household;
      comparing a first private IP address of the panelist impression record with a second private IP address of the census impression record to identify a device in the household; and
      comparing a first timestamp of the panelist impression record with a second timestamp of the census impression record; and
   send a comparison result to a computer of an audience measurement entity, the comparison result indicative of a match confirming the census impression record corresponds to the panelist impression record of the audience measurement entity.

8. The non-transitory computer readable medium of claim 7, wherein the instructions, when executed, cause the processor circuitry to determine whether the census impression record corresponds to the panelist impression record by determining whether a difference between the first timestamp and the second timestamp is less than a threshold value.

9. The non-transitory computer readable medium of claim 7, wherein the instructions, when executed, cause the processor circuitry to:
   log the census impression record based on a census impression request received in a hypertext transfer protocol secure request, and
   access the first public IP address and the first timestamp from the hypertext transfer protocol secure request.

10. The non-transitory computer readable medium of claim 7, wherein the instructions, when executed, cause the processor circuitry to access the first public IP address and the first private IP address from the panelist impression record.

11. The non-transitory computer readable medium of claim 7, wherein the instructions, when executed, cause the processor circuitry to log the census impression record based on a census impression request received via a network communication from a client device.

12. The non-transitory computer readable medium of claim 7, wherein the instructions, when executed, cause the processor circuitry to log the census impression record based on a census impression request received as a hypertext transfer protocol secure request.

13. A method comprising:
   determining, by executing an instruction with a processor, whether a census impression record corresponds to a panelist impression record by:
      comparing, by executing an instruction with the processor, a first public internet protocol (IP) address of the panelist impression record with a second public IP address of the census impression record to identify a household;
      comparing a first private IP address of the panelist impression record with a second private IP address of the census impression record to identify a device in the household; and
      comparing, by executing an instruction with the processor, a first timestamp of the panelist impression record with a second timestamp of the census impression record; and
   sending, by executing an instruction with the processor, a comparison result to a computer of an audience measurement entity, the comparison result indicative of a match confirming the census impression record corresponds to the panelist impression record of the audience measurement entity.

14. The method of claim 13, further including determining whether the census impression record corresponds to the panelist impression record by determining whether a difference between the first timestamp and the second timestamp is less than a threshold value.

15. The method of claim 13, further including:
   logging the census impression record based on a census impression request received in a hypertext transfer protocol secure request, and
   accessing the first public IP address and the first timestamp from the hypertext transfer protocol secure request.

16. The method of claim 13, further including accessing the first public IP address and the first private IP address from the panelist impression record.

17. The method of claim 13, further including logging the census impression record based on a census impression request received via a network communication from a client device.

18. The method of claim 13, further including logging the census impression record based on a census impression request received as a hypertext transfer protocol secure request.

19. A system comprising:
   at least one memory;
   programmable circuitry; and
   instructions to cause the programmable circuitry to:
      obtain a public internet protocol (IP) address associated with a household and a timestamp in response to a census impression request indicating a media access on a first client device of the household;

distinguish the first client device from a second client device of the household based on a comparison of a first private IP address of the first client device and a second private IP address of the second client device;

store the public IP address, the first private IP address, and the timestamp in a panelist impression record in association with a panelist identifier, the panelist identifier corresponding to a panelist audience member of an audience measurement entity;

send the census impression request to a census system; and send the panelist impression record to a meter collection system.

20. The system of claim 19, wherein the programmable circuitry is to generate the census impression request in response to the first client device accessing media via at least one of a website or an app.

21. The system of claim 19, wherein the programmable circuitry is to intercept the census impression request by intercepting a hypertext transfer protocol secure request from at least one of a web browser or an app.

22. The system of claim 19, wherein the programmable circuitry is to detect the census impression request based on a domain name in a uniform resource locator of the census impression request.

23. The system of claim 19 wherein the programmable circuitry is to include the second private IP address of the second client device in the panelist impression record.

24. The system of claim 19, wherein the programmable circuitry is to send the panelist impression record to the meter collection system by sending a log file that includes the panelist impression record and a plurality of second panelist impression records to the meter collection system.

25. The system of claim 24, wherein the programmable circuitry is to send the log file to the meter collection system at intervals specified by the audience measurement entity.

26. The apparatus of claim 1, wherein the processor circuitry is to include a media identifier in the comparison result, the media identifier to identify media accessed by a panelist.

* * * * *